US012412023B2

(12) United States Patent
Gollamudi et al.

(10) Patent No.: US 12,412,023 B2
(45) Date of Patent: Sep. 9, 2025

(54) IDENTIFYING AND FORMATTING HEADERS FOR TEXT CONTENT

(71) Applicant: Oracle International Corporation, Redwood Shores, CA (US)

(72) Inventors: Sagar Gollamudi, San Diego, CA (US); Vishank Bhatia, Sunnyvale, CA (US); Xu Zhong, Vermont South (AU); Thanh Long Duong, Point Cook (AU); Mark Johnson, Castle Cove (AU); Srinivasa Phani Kumar Gadde, Fremont, CA (US); Vishal Vishnoi, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/650,928

(22) Filed: Apr. 30, 2024

(65) Prior Publication Data

US 2024/0419886 A1    Dec. 19, 2024

Related U.S. Application Data

(63) Continuation of application No. 18/334,238, filed on Jun. 13, 2023, now Pat. No. 12,001,775.

(51) Int. Cl.
*G06F 40/103*    (2020.01)
(52) U.S. Cl.
CPC ............................... *G06F 40/103* (2020.01)
(58) Field of Classification Search
None
See application file for complete search history.

(56) References Cited

U.S. PATENT DOCUMENTS

| 7,725,499 | B1 * | 5/2010 | von Lepel | G06Q 30/02 |
| | | | | 707/811 |
| 8,910,036 | B1 * | 12/2014 | Cromwell | H02M 3/33546 |
| | | | | 715/249 |

(Continued)

FOREIGN PATENT DOCUMENTS

CN    106951400 A    7/2017

OTHER PUBLICATIONS

Aliyu et al., "SED: An Algorithm for Automatic Identification of Section and Subsection Headings in Text Documents", IJCSI International Journal of Computer Science Issues, vol. 17, No. 6, Nov. 2020, pp. 40-47.
Bruijn L., "Extracting headers and paragraphs from pdf using PyMuPDF", Retrieved from https://towardsdatascience.com/extracting-headers-and-paragraphs-from-pdf-using-pymupdf-676e8421c467, Apr. 9, 2020, pp. 1-8.

(Continued)

*Primary Examiner* — Toan H Vu
(74) *Attorney, Agent, or Firm* — Invoke

(57) ABSTRACT

A data corpus is partitioned into text strings for header classification. A group characteristic is computed for a text string, and whether the group characteristic satisfies a group characteristic criterion is determined. The text string may be disqualified from header classification if the group characteristic criterion is not satisfied, or one or more font characteristics may be determined for the text string if the group characteristic criterion is satisfied. A font characteristic that meets one or more prevalence criteria may be identified and evaluated to determine whether the font characteristic meets at least one font characteristic criterion. The text string may be disqualified from header classification if the font characteristic criterion is not satisfied, or if the font characteristic meets the font characteristic criterion, the text string is classified as a header, and tagged content is generated by applying a header tag to the text string.

30 Claims, 11 Drawing Sheets

(56) References Cited

U.S. PATENT DOCUMENTS

| | | | |
|---|---|---|---|
| 9,805,073 | B1 | 10/2017 | Davis |
| 9,952,763 | B1 | 4/2018 | Bi |
| 10,467,338 | B2 | 11/2019 | Hasan et al. |
| 10,909,360 | B2 | 2/2021 | Omiya et al. |
| 11,327,646 | B2 | 5/2022 | Tran et al. |
| 11,347,945 | B2 | 5/2022 | Sato |
| 2015/0254530 | A1* | 9/2015 | Gulwani ............... G06F 40/151 382/187 |
| 2015/0294591 | A1 | 10/2015 | Kullok et al. |
| 2017/0091151 | A1 | 3/2017 | Jones et al. |
| 2017/0147202 | A1 | 5/2017 | Donohue |
| 2019/0317993 | A1 | 10/2019 | Toda |
| 2020/0151244 | A1 | 5/2020 | Rastogi et al. |
| 2021/0110153 | A1 | 4/2021 | Gupta et al. |
| 2021/0206481 | A1 | 7/2021 | Brion et al. |
| 2022/0101060 | A1* | 3/2022 | Wang .................... G06V 10/44 |
| 2022/0366131 | A1* | 11/2022 | Ekron ................... G06F 16/986 |
| 2023/0040725 | A1* | 2/2023 | Javeri ................. G06F 9/30076 |
| 2023/0334242 | A1 | 10/2023 | Dadoo et al. |

OTHER PUBLICATIONS

Budhiraja et al., "A Supervised Learning Approach For Heading Detection", Sep. 2018, pp. 1-20.

Could clustering be used to parse pdf documents to get headings and titles?, Retrieved from https://ai.stackexchange.com/questions/20352/could-clustering-be-used-to-parse-pdf-documents-to-get-headings-and-titles, Retrieved on Jan. 13, 2023, pp. 1-2.

Hofer C., "Development of a structure-aware PDF parser", Retrieved from https://medium.com/@_chriz_/development-of-a-structure-aware-pdf-parser-7285f3fe41a9, September 6. 2020, pp. 1-9.

IText-PDF reading issue on heading levels ( h1-h6 ), Retrieved from https://stackoverflow.com/questions/30001953/itext-pdf-reading-issue-on-heading-levels-h1-h6, Retrieved on Jan. 13, 2023, pp. 1-5.

Knowledge Extraction, Kore.ai Documentation v7.1, Retrieved from https://developer.kore.ai/v7-1/docs/bots/bot-builder-tool/knowledge-task/knowledge-extraction-service/, Retrieved on Jan. 13, 2023, pp. 1-6.

Vanderbeck S. et al., "A Machine Learning Approach to Identifying Sections in Legal Briefs", Midwest Artificial Intelligence and Cognitive Science Conference, 2011, pp. 7.

\* cited by examiner

Rendered Tagged Content

522b — 540b — 500

What does it mean to be in the cloud?

[In the simplest terms, being in the cloud means two things:

The solution is located somewhere else and accessed through the internet rather than located on hardware that you own and maintain on premise.

You pay a subscription fee to access the solution rather than paying up-front for a perpetual license. The subscription fees include technical support; the solution provider applies patches and updates to the solution on your behalf.

By comparison, JD Edwards EnterpriseOne applications by themselves are not in the cloud. They are traditional software applications sold through a perpetual license and have historically been deployed on premise.

You have many options through which you can take advantage of the cloud. These options fall mainly into two categories: using Oracle Cloud Applications (SaaS – Software as a Service) and running JD Edwards on Oracle Cloud Infrastructure (IaaS – Infrastructure as a Service).]

522c — 508x, 508y — 540a

Oracle Cloud Applications (SaaS)

[The Oracle Cloud Applications suite supports the same business processes as JD Edwards EnterpriseOne. While a few customers have moved to Oracle Cloud Applications, some customers are integrating JD Edwards EnterpriseOne with Oracle Cloud Applications to augment and extend existing functionality.]

508x

522c — 540a

JD Edwards on Oracle Cloud Infrastructure (IaaS)

[JD Edwards EnterpriseOne applications can be run on Oracle Cloud Infrastructure. Rather than buying and maintaining hardware and network components, customers can instead subscribe to physical hardware and storage capacity and use these to run JD Edwards EnterpriseOne. Many JD Edwards customers are taking this approach today.]

IDENTIFYING AND FORMATTING HEADERS FOR TEXT CONTENT

INCORPORATION BY REFERENCE; DISCLAIMER

Each of the following applications are hereby incorporated by reference: application Ser. No. 18/334,238 filed on Jun. 13, 2023. The applicant hereby rescinds any disclaimer of claims scope in the parent application(s) or the prosecution history thereof and advises the USPTO that the claims in the application may be broader than any claim in the parent application(s).

TECHNICAL FIELD

The present disclosure relates to adding header tags to text.

BACKGROUND

Header tags may be used to define headings and subheadings in electronic documents or other electronically displayed content. The header tags may cause the headings or subheadings to appear in a format specified by the header tag. The content of this background section should not be construed as prior art merely by virtue of its presence in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIGS. 5B-5D illustrate a user interface rendering tagged content corresponding to the example data corpus shown in FIGS. 4A-4D, in accordance with one or more embodiments.

DETAILED DESCRIPTION

Figure 1A:
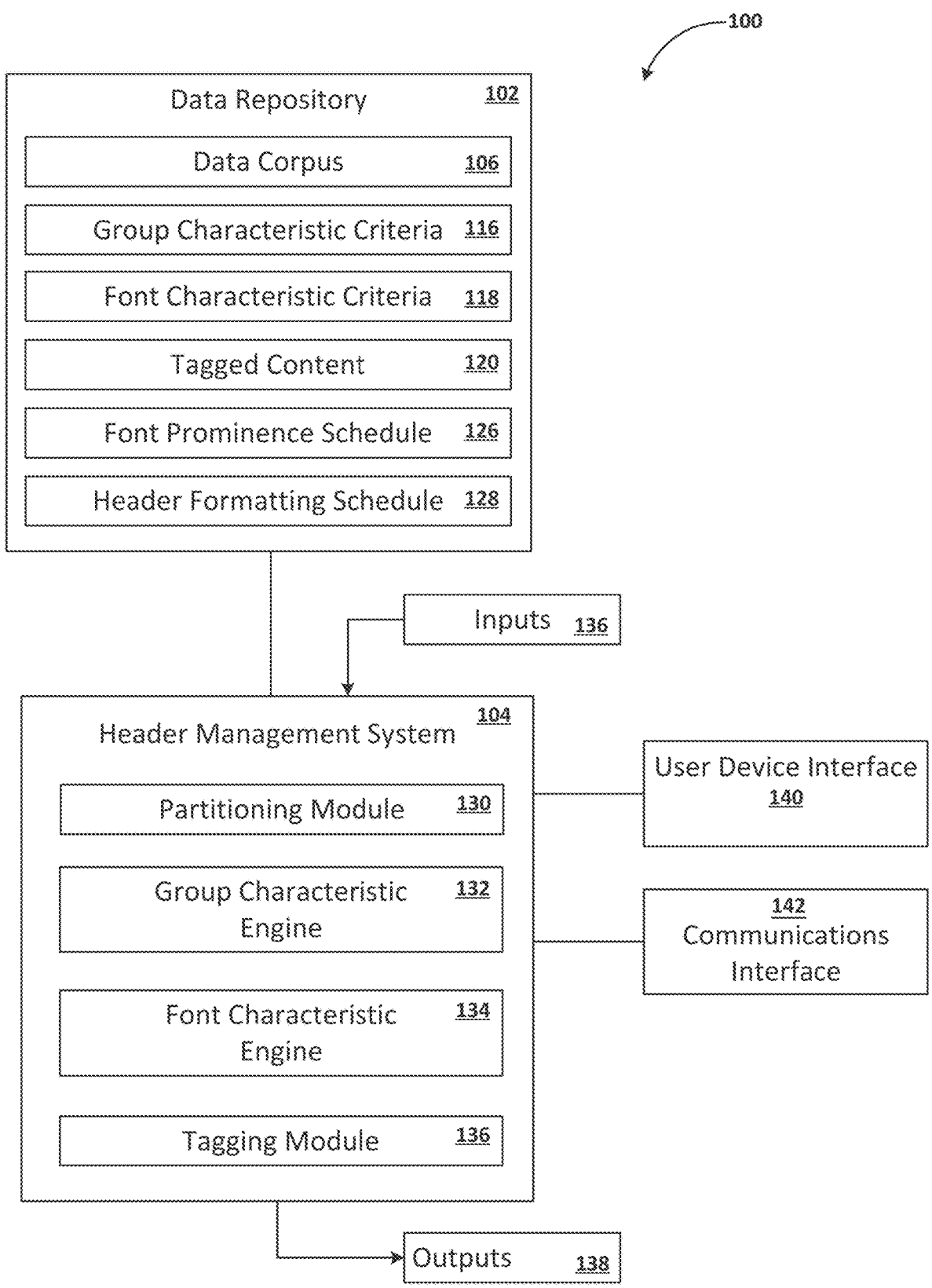
FIG. 1A illustrates a system that includes a data repository and a header management system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. HEADER MANAGEMENT SYSTEM
    A. Data Repository Features.
        i. Group Characteristics.
        ii. Font Characteristic.
        iii. Header Formatting.
    B. Header Management System Modules.
3. SYSTEM OPERATIONS
4. HEADER MANAGEMETN INTERFACE
5. PRACTICAL APPLICATIONS, ADVANTAGES & IMPROVEMENTS
6. HARDWARE OVERVIEW
7. COMPUTER NETWORKS AND CLOUD NETWORKS
8. MISCELLANEOUS; EXTENSIONS

1. General Overview

One or more embodiments partition a data corpus into a plurality of text strings, and generate header tags for those text strings in the data corpus that meet criteria for classifying the text string as a header. The criteria for classifying text strings as a header includes one or more group characteristic criteria, and one or more font characteristic criteria. As used herein, the term "group characteristic" refers to a characteristic of a text string as a whole such as, for example, a number of elements in the text string. As used herein, the term "font characteristic" refers to a font property or a characteristic associated with a font property.

A data corpus may be partitioned into text strings for header classification. A group characteristic is computed for respective text strings, and whether the group characteristic satisfies one or more group characteristic criteria is determined. Text strings that do not meet the one or more group characteristic criteria are disqualified from classification as a header and are not further evaluated against the one or more font characteristic criteria. A text string that satisfies the one or more group characteristic criteria is further evaluated to identify a font characteristic of the text string that meets one or more prevalence criteria. If the font characteristic does not meet any of the font characteristic criteria, the text string is disqualified from header classification. If the font characteristic meets at least one of one or more font characteristic criteria, the text string is classified as a header and tagged content is generated by applying a header tag to the text string.

Header tags with different formats may be applied to various text strings that are classified as a header. The particular header tags that are applied to text strings and their corresponding formats may be determined based on the prominence of the font properties of the text string. For example, text strings that have more prominent font properties may receive more prominent header tags relative to text strings that have less prominent font properties. The tagged content may be rendered for display, for example, in response to a query, with the header tags serving as headings or subheadings for related text strings in the data corpus.

This General Overview section is intended to provide a general overview without addressing all aspects of the present disclosure. The full scope of the presently disclosed subject matter is understood from the content of the present disclosure in its entirety.

2. Header Management System

Figure 1B:
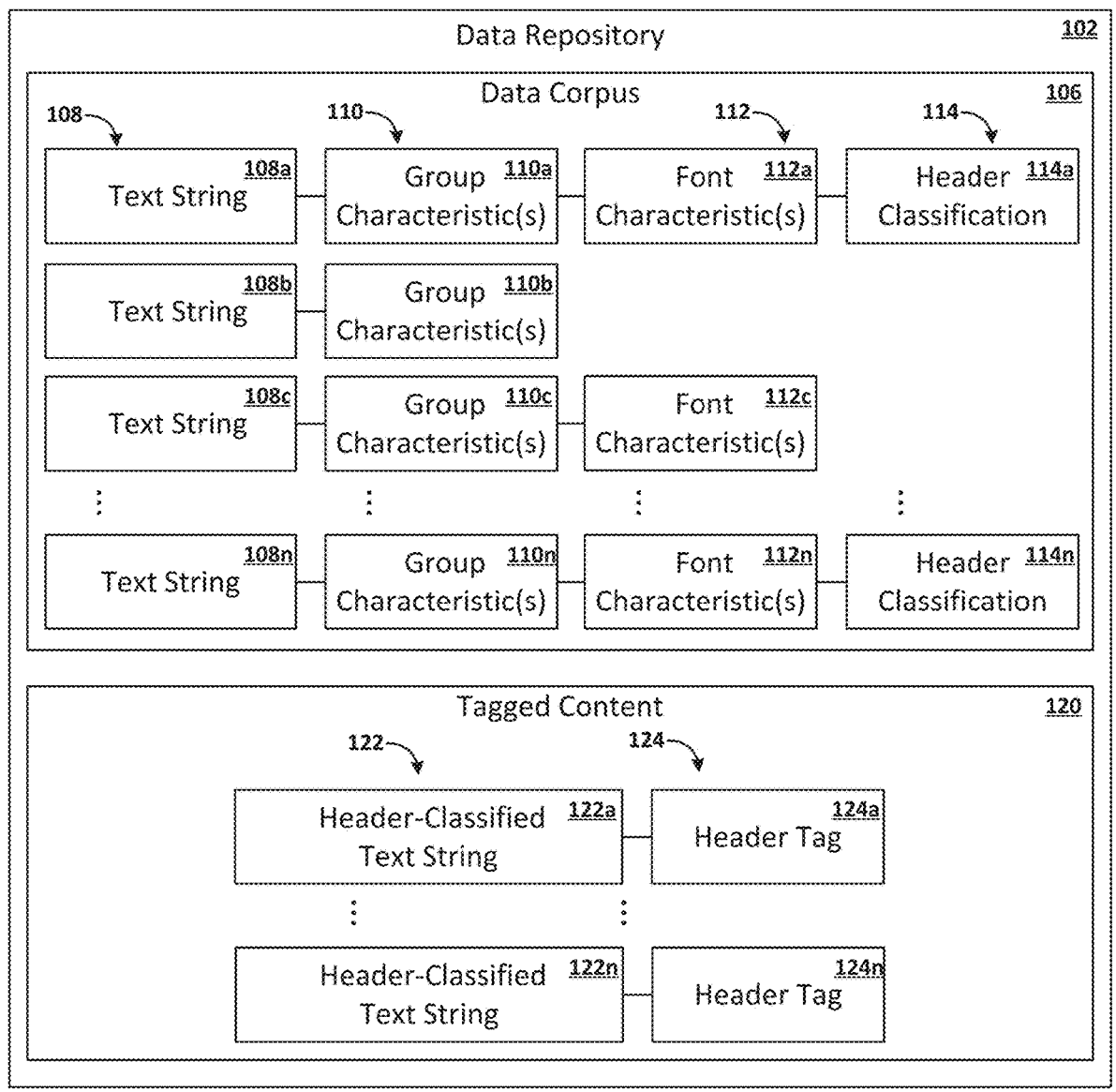
FIG. 1B illustrates features of a data repository including a data corpus and tagged content in accordance with one or more embodiments.

Referring now to FIGS. 1A and 1B, example systems are described. As shown in FIG. 1A, a system 100 in accordance with one or more embodiments may be associated with document search operations, and more particularly header classification and tagging operations that generate tagged content by applying header tags to text strings that are classified as a header by the system 100. The system 100 may be utilized to perform operations in accordance with the present disclosure. The system 100 may include a data repository 102 and a header management system 104 communicatively coupled or couplable with one another. The data repository 102 may include data utilized and/or stored by the header management system 104 in association with various operations. The header management system 104 may include hardware and/or software configured to carry out the various operations. The various operations may include header management operations, such as partitioning operations, group characteristic operations, font characteristic operations, or tagging operations, as respectively described herein. One or mor of the various operations of the header management system 104 may be performed to generate tagged content for text strings that are classified as a header based on meeting one or more group characteristic criteria and one or more font characteristic criteria.

A. Data Repository Features.

The data repository 102 may include a data corpus 106. The data corpus 106 may include content accessible by the header management system 104. The content of the data corpus 106 may include text content, such as documents, files, websites, guides, manuals, checklists, queries, frequently-asked-questions (FAQs), answers, eBooks, eMagazines, eNewspapers, blog posts, whitepapers, infographics, emails, social media, audio transcriptions, video transcriptions, webinars, case studies, or the like. The content may be generated, processed, and/or stored according to at least one of a page description language or a markup language.

In one example, the data corpus 106 may include content configured according to a static page description language, such as a Portable Document Format (PDF) page description language or an XML Paper Specification (XPS) page description language. Additionally, or in the alternative, the data corpus 106 may include content configured according to a dynamic page description language, such as a PostScript (PS) page description language or an Encapsulated Post-Script (EPS) page description language.

In one example, the data corpus 106 may include content configured according to a markup language such as Standard Generalized Markup Language (SGML), HyperText Markup Language (HTML), Extensible Markup language (XML), or Extensible HyperText Markup language (XHTML). Additionally, or in the alternative, the markup language may include a document markup language, such as OpenDocument Format (ODF), or Office Open XLM (OOXML). Additionally, or in the alternative, the markup language may include a lightweight markup language, such as Markdown, AsciiDoc, or reStructuredText.

As shown in FIG. 1B, the data corpus 106 may include a plurality of text strings 108. The text strings 108 may be generated from one or more partitioning operations performed upon at least a portion of the data corpus 106. A text string 108 may represent human-readable text. A text string 108 may include a plurality of elements, such as words, phrases, or sentences. In one example, a text string 108 may include a set of one or more words. The plurality of text strings 108 may have an arbitrary or finite length. The length of the text strings 108 may be determined by a lexical analyzer and/or a parser.

The data corpus 106 may include one or more group characteristic indicators 110 respectively associated with a corresponding text string 108. The one or more group characteristic indicators 110 corresponding to a respective text string 108 may include an indication of one or more group characteristics associated with the respective text string 108. A text string 108 may have a one-to-one relationship with a group characteristic indicator 110, or a one-to-many relationship with a plurality of group characteristic indicators 110. For example, as shown in FIG. 1B, one or more first group characteristic indicators 110a corresponding to a respective group characteristic may be associated with a first text string 108a. One or more group characteristics, for example, as indicated by the group characteristic indicators 110, may be utilized by the system 100 to determine whether to classify a particular text string 108 as a header.

The data corpus 106 may include one or more font characteristic indicators 112 respectively associated with a corresponding text string 108. The one or more font characteristic indicators 112 corresponding to a respective text string 108 may include an indication of one or more font characteristics associated with the respective text string 108. A text string 108 may have a one-to-one relationship with a font characteristic indicator 112, or a one-to-many relationship with a plurality of font characteristic indicators 112. For example, as shown in FIG. 1B, one or more first font characteristic indicators 112a may be associated with a first text string 108a.

The data corpus 106 may include a header classification indicator 114 associated with a corresponding text string 108. The header classification indicator 114 may indicate whether the text string 108 is classified as a header. In one example, the data corpus 106 may include a subset of text strings 108 that are classified as a header, for example, as indicated by a presence of a header classification indicator 114. In one example, a text string 108 that is not classified as a header may lack a header classification indicator 114 associated with the text string 108. Alternatively, a text string 108 that is not classified as a header may include a header classification indicator 114 that includes an indication that the text string 108 is not classified as a header.

Referring further to FIG. 1B, a plurality of group characteristic indictors 110 may be respectively associated with a corresponding text string 108. One or more group characteristics indicated by the group characteristic indicator 110 corresponding to a text string 108 may be compared to one or more group characteristic criteria. For text strings 108 that meet the one or more group characteristic criteria, a font characteristic indicator 112 may be associated with the text string 108. For example, as shown in FIG. 1B, a first font characteristic indicator 112*a* may be associated with a first text string 108*a* based on one or more group characteristics associated with a first group characteristic indicator 110*a* meeting the one or more group characteristic criteria. Additionally, or in the alternative, as shown in FIG. 1B, a second text string 108*b* may lack a font characteristic indicator 112, for example, based on one or more group characteristics associated with a second group characteristic indicator 110*b* failing to meet the one or more group characteristic criteria. For text strings 108 that meet the one or more group characteristic criteria, one or more font characteristics indicated by the font characteristic indicator 110 corresponding to a respective text string 108, may be compared to one or more font characteristic criteria. In one example, text strings 108 that meet each of the one or more group characteristic criteria are evaluated against the one or more font characteristic criteria, and text strings that fail to meet at least one group characteristic criteria are disqualified.

Text strings 108 that meet the one or more font characteristic criteria may be classified as a header. As shown in FIG. 1B, one or more header classification indicators 114 may be respectively associated with a corresponding text string 108 that meets the one or more font characteristic criteria. For example, as shown, a header classification indicator 114*a* may be associated with the first text string 108*a* based on one or more font characteristics associated with the first font characteristic indicator 112*a* meeting the one or more group characteristic criteria. Additionally, or in the alternative, as shown in FIG. 1B, a third text string 108*c* may lack a header classification indicator 114, for example, based on one or more font characteristics associated with a third font characteristic indicator 112*c* failing to meet the one or more font characteristic criteria. The data corpus 106 may include one or more text strings 108 that are classified as a header. For example, as shown in FIG. 1B, in addition to the first text string 108*a*, the data corpus 106 may include a fourth text string 108*n* that is classified as a header, as indicated, for example, by a fourth header classification indicator 114*n*.

i. Group Characteristics.

Referring again to FIG. 1A, the data repository 102 may include one or more group characteristic criteria 116. As used herein, the term "group characteristic criteria" refers to one or more group characteristics that may be utilized in at least a portion of a determination as to whether a text string may be classified as a header and/or whether a text string may be disqualified from classification as a header. In one example, the group characteristic criteria 116 may include one or more criteria based on a number of elements within a text string 108. Additionally, or in the alternative, the group characteristic criteria 116 may include one or more criteria based on a kind of content within a text string 108.

A group characteristic criterion 116 based on a number of elements within a text string 108 may be based on a total number of elements, a percentage of the total number of elements, or a range for the number of elements. The total number or percentage of elements may include an upper threshold or a lower threshold. The number or percentage of elements may be determined based on words, characters, or sentences.

In one example, a group characteristic indicator 110 representing a group characteristic based on a total number of elements in a text string 108 may indicate a count of the total number of elements in the text string 108. Additionally, or in the alternative, the group characteristic indicator 110 may indicate whether the text string 108 meets a group characteristic criterion 116 based on the total number of elements. For example, a group characteristic indicator 110 representing a group characteristic criterion 116 based on the total number of elements may be associated with a text string 108 that has fifty (50) elements, such as fifty (50) words. The group characteristic indicator 110 may indicate that the text string 108 has fifty (50) elements, and/or whether the fifty (50) elements in the text string 108 meets the group characteristic criterion 116. A text string 108 that meets a group characteristic criterion 116 based on the total number of elements within the text string 108 may be evaluated against one or more font characteristic criteria 118 for classification as a header.

For a group characteristic criterion 116 based on an upper threshold number of elements in a text string 108, in one example, the upper threshold may be forty (40) elements. A group characteristic indicator 110 may indicate whether the number of elements in a corresponding text string 108 meets (e.g., is below) the upper threshold number. For a first text string 108 that has fifty (50) elements, a corresponding first group characteristic indicator 110 may indicate that the first text string 108 has fifty (50) elements, and/or that the first text string 108 is above, or does not meet, the upper threshold. Additionally, or in the alternative, for a second text string 108 that has ten (10) elements, a corresponding second group characteristic indicator 110 may indicate that the second text string 108 is below, or meets, the upper threshold.

For a group characteristic criterion 116 based on a lower threshold number of elements in a text string 108, in one example, the lower threshold may be twenty (20) elements. A group characteristic indicator 110 may indicate whether the number of elements in a corresponding text string 108 meets (e.g., is above) the lower threshold number. For the first text string 108 that has fifty (50) elements, the corresponding first group characteristic indicator 110 may indicate that the first text string 108 has fifty (50) elements, and/or that the first text string 108 is above, or meets, the lower threshold. Additionally, or in the alternative, for the second text string 108 that has ten (10) elements, the corresponding second the group characteristic indicator 110 may indicate that the second text string 108 that has ten (10) elements, and/or that the second text string 108 is below, or does not meet, the lower threshold.

For a group characteristic criterion 116 based on a range for the number of elements in a text string 108, in one example, the range may be from twenty (20) to forty (40) elements. A group characteristic indicator 110 may indicate whether the number of elements in a corresponding text string 108 is within the range. For the first text string 108 that has fifty (50) elements, the corresponding first group characteristic indicator 110 may indicate that the first text string 108 has fifty (50) elements, and/or that the first text string 108 is outside, or above, the range. Additionally, or in the alternative, for the second text string 108 that has ten (10) elements, the corresponding second group characteristic indicator 110 may indicate that the second text string 108 has ten (10) elements, and/or that the second text string 108 is outside, or below, the range. Additionally, or in the alternative, for a third text string 108 that has thirty (30) elements, a corresponding third group characteristic indicator 110 may indicate that the third text string 108 has five (5) elements, and/or that the third text string 108 meets, or is within, the range.

In one example, a group characteristic criterion 116 based on the kind of content within a text string 108 may be based on whether the text string includes at least one of: a word or a string of words, a sentence or a string of sentences, a paragraph, one or more list elements, one or more hypertext, one or more hyperlinks. For example, a group characteristic criterion 116 may prohibit list elements, such as bullet list elements, outline list elements, or number list elements, as well as combinations of these. Additionally, or in the alternative, a group characteristic criterion 116 may prohibit at least one of: ordered list elements, unordered list elements, or descriptive list elements. For a group characteristic criterion 116 that prohibits list elements, a corresponding group characteristic indicator 110 may indicate whether a text string 108 includes one or more list elements, the kind of list elements, and/or whether the text string 108 meets the group characteristic criterion. A text string 108 that meets a group characteristic criterion 116 based on the kind of content within the text string 108 may be evaluated against one or more font characteristic criteria 118 for classification as a header.

In one example, a group characteristic criterion 116 based on the kind of content within a text string 108 may be based on whether the text string 108 includes hypertext and/or one or more hyperlinks. For example, a group characteristic criterion 116 may prohibit one or more kinds of hypertext, such as static hypertext, dynamic hypertext. Additionally, or in the alternative, the one or more kinds of hypertext may include axial hypertext, arborescent hypertext, networked hypertext, or layered hypertext, as well as combinations of these. As another example, a group characteristic criterion 116 may prohibit one or more kinds of hyperlinks, such as inline links, anchor links, or extended links, as well as combinations of these. The prohibition on hypertext and/or hyperlinks may prohibit any hypertext and/or hyperlink, or the prohibition on hypertext and/or hyperlinks may be based on a number of elements of hypertext and/or hyperlink within the text string 108. For example, a group characteristic criterion 116 may prohibit hyperlinks based on a threshold number of hypertext and/or hyperlinks elements, or a percentage of elements in the text string 108 that are hypertext and/or a hyperlink. For a group characteristic criterion 116 that prohibits hypertext and/or hyperlinks, a corresponding group characteristic indicator 110 may indicate whether a text string 108 includes hypertext and/or a hyperlink, the kind of hypertext and/or a hyperlink, and/or whether the text string 108 meets the group characteristic criterion 116. In one example, a text string 108 that includes hypertext and/or a hyperlink may fail to meet a group characteristic criterion 116 and may be disqualified from classification as a header based on containing hypertext and/or a hyperlink, and/or based on being entirely hypertext and/or entirely a hyperlink. In one example, a text string 108 that includes hypertext and/or a hyperlink that represents only a portion of the text string may meet a group characteristic criterion 116 and may be evaluated against one or more font characteristic criteria 118 for classification as a header.

i. Font Characteristics.

Referring further to FIG. 1A, the data repository 102 may include one or more font characteristic criteria 118. As used herein, the term "font characteristic criteria" refers to one or more font characteristics that may be utilized in at least a portion of a determination as to whether a text string may be classified as a header and/or whether a text string may be disqualified from classification as a header. The font characteristic criteria 118 may include one or more criteria based on a font property of at least some elements within a text string 108. Additionally, or in the alternative, the font characteristic criteria 118 may include one or more prevalence criteria applicable to a font property. In one example, referring to FIG. 1B, a font characteristic indicator 112 may represent the presence or absence of one or more font characteristics with respect to a corresponding text string 108. Additionally, or in the alternative, the font characteristic indicator 112 may indicate whether the text string 108 meets one or more font characteristic criterion 118. A text string 108 that meets the one or more font characteristic criterion 118 may be classified as a header.

A font characteristic criterion 118 based on a font property may include a criterion as to whether a text string 108 includes at least one of: bold characters, italic characters, underline characters, enlarged characters relative to a distinctive font type (e.g., according to a distinctive font schedule and/or a presence of distinctive font type features), a distinctive color (e.g., according to a distinctive color schedule and/or a difference in Euclidean distance between color tuples), a font size threshold, a font size difference, uppercase characters, capitalized characters, or color characters.

For a font characteristic criterion 118 based on a distinctive font type, the criterion may be based on one or more font types in a distinctive font schedule. The distinctive font schedule may include a list of font types that are considered distinctive and/or a list of font types that are considered indistinctive. Whether a font type is distinctive or indistinctive may be determined based on a category of the font type. One or more categories of font type may be considered distinctive. One or more categories of font type may be considered indistinctive. Example categories of font types may include: serif, sans-serif, script, informal, or blackletter.

Additionally, or in the alternative, whether a font type is distinctive or indistinctive may be determined based on a classification of the font type. One or more classifications of font type may be considered distinctive. One or more classification of font type may be considered indistinctive. Example classifications of font types may include: neo-grotesque (e.g., Helvetica, Interstate, or Univers), grotesque (e.g., Akzidenz Grotesk, or Franklin Gothic), old style (e.g., Garamond, Scala, or Minion), transitional (e.g., Times New Roman, Caslon, or Arnhem), slab serif (e.g., Rockwell, Caecilia, or Gill Sans), geometric sans-serif (e.g., Futura, Avant Garde), humanist (e.g., Frutiger, Optima, or Agenda), didone (e.g., Walbaum, Matrix, or Bodoni), old style (e.g., Bembo, Sabon, or Dalliance), geometric (e.g., Neutraface, Nobel, or Bank Gothic), antiqua (e.g., Rotis, or Fleishmann), calligraphic (e.g., Zapfino), or casual (e.g., Mistral, Hands, or Bello).

Additionally, or in the alternative, a distinctive font type may be determined based on one or more distinctive font type features. The one or more distinctive font type features may include at least one of: such typeface, contrast, consistency, cap height, x-height, height ratio (x-height/cap height), ascenders, descenders, bowls, ears, stems, links, terminals, brackets, stroke weight, character spacing, alignment (e.g., right, left, center), or line height.

For a font characteristic criterion 118 based on a distinctive color, the criterion may be based on one or more colors in a distinctive color schedule. The distinctive color schedule may include a list of one or more colors that are considered distinctive and/or a list of one or more colors that are considered indistinctive. Additionally, or in the alternative, whether a color is distinctive or indistinctive may be determined based on a difference in Euclidean distance between color tuples.

In one example, the font colors may be configured according to a red-blue-green color space (RGB), such as sRGB (standard RGB color space). The color tuples may include components for red, green, and blue, represented by a vector, (R,G,B), where "R" is a red component vector, "G" is a green component vector, and "B" is a blue component vector. In one example sRGB may be an RGB24 format that has 24 bits per pixel, providing R, G, and B vectors that may respectively range from 0 to 255. Example color tuples for various color text may include: black: (0,0,0), red: (255,0,0), orange: (255,128,0), yellow: (255,255,0), green: (0,255,0), blue: (0,0,255), violet (238,130,238), gray: (128,128,128), or white (255,255,255).

In one example, a first color tuple may correspond to a first text string 108, and the first color tuple may be compared to one or more comparative color tuples to determine a Euclidean distance between them. The one or more comparative color tuples may be a baseline color tuple, such as black that has an RGB vector of (0,0,0). Additionally, or in the alternative, the one or more comparative color tuples may correspond to one or more adjacent text strings 108, such as one or more adjacent text strings 108 representing an adjacent line of text. In one example, a font characteristic criterion 118 based on a Euclidean distance between color tuples may include a threshold distance between the color tuple corresponding to a respective text string 108 and the one or more comparative color tuples. In one example, a font characteristic that meets a threshold difference in color may meet the font characteristic criterion 118 based on distinctive color. In one example, the threshold difference in color may be determined based on a difference in any one or more vectors in the tuple or based on a sum of the vectors in the respective tuples. In one example, the threshold difference in color may be a difference of from 20% to 50% of the range for any one or more vectors in the tuple, or for the sum of the vectors in the respective tuples. For example, with a threshold difference of 40% of the range for any one tuple, a green color tuple that has an RGB vector of (0,128,0) would meet the threshold difference in color relative to black as baseline color tuple, with an RGB vector of (0,0,0). As another example, with a threshold difference of 40% of the range for the sum of vectors in the respective tuples, a gray color tuple that has an RGB vector of (128,128,128) would meet the threshold difference in color relative to black as baseline color tuple, with an RGB vector of (0,0,0).

For a font characteristic criterion 118 based on a font size difference, the criterion may be based on a comparison to one or more comparative font sizes. The comparison may include a determination as to whether a text string 108 includes elements that have a font size property that meet a threshold size differences relative to the comparative font size. For example, a comparative font size may represent a standard font size, such as 12-point font. Additionally, or in the alternative, a comparative font size property may be determined based on one or more adjacent text strings 108, such as one or more adjacent text strings 108 representing an adjacent line of text. For example, a first font size property corresponding to a first text string 108 may be compared to one or more font size properties corresponding to the one or more adjacent text strings 108 to determine a difference between them. The criterion based on size difference may include a threshold difference in font size, such as an upper threshold or a lower threshold. In one example, a font characteristic that meets a threshold difference in font size, may meet the font characteristic criterion 118 based on a font size difference. In one example, the threshold difference in size may be 2 points, 4 points, 6 points, or 8 points. Additionally, or in the alternative, a distinctive font schedule may include a list of one or more font sizes that are considered distinctive and/or a list of one or more font sizes that are considered indistinctive.

A font characteristic criterion 118 based on one or more prevalence criteria may include a criterion as to a prevalence of one or more font properties within the text string 108. The prevalence of a font characteristic may be determined based on a total number of elements, or a percentage of the total number of elements. The number of elements may be determined based on words, characters, or sentences. In one example, a font characteristic criterion 118 may consider a font characteristic in a text string 108 to be prevalent based on the font characteristic corresponding to a prevalence threshold number of elements in the text string 108. Additionally, or in the alternative, a font characteristic that corresponds to all elements in a text string may be considered prevalent. In one example, the prevalence threshold may be 50%, or 75% of the elements in the text string 108. In one example, the prevalence of a font characteristic may be determined based on an occurrence frequency relative to one or more adjacent text strings 108, such as one or more adjacent text strings 108 representing an adjacent line of text.

Embodiments determine whether a text string should be considered header text based on whether font characteristics, which are determined to be sufficiently prevalent in the text string, satisfy font characteristic criterion 118. In one example, one or more font characteristic of a text string 108 may be compared to one or more font characteristic criterion 118 that are based on a prevalence criterion. Subsequently, one or more font characteristic of the text string 108 may be compared to one or more font characteristic criterion 118 that are based on a font property. For example, a font property of the text string 108 may be compared to a font characteristic criterion 118 that is based on a prevalence criterion to determine whether the font property is sufficiently prevalent in the text string 108, and upon determining that the font property is sufficiently prevalent in the text string 108, the font property may be compared to a font characteristic criterion 118 that is based on a font property. One or more font properties may be evaluated for prevalence, and sufficiently prevalent font properties may be evaluated to determine whether the font property meets one or more font criteria for classification as a header. In one example, a text string 108 that includes entirely bold font may meet a prevalence criterion and may thereby be evaluated to determine whether the bold font meets one or more font characteristic criteria for classifying the text string 108 as a header. In another example, a text string 108 that includes one bold word that represents five percent (5%) of the text string may fail to meet a prevalence criterion and may thereby be disqualified from classification as a header, for example, without further evaluation against other font characteristic criteria 118.

In one example, a font property that is the most common font property in the text string 108 may be evaluated to determine whether the font property meets one or more font criteria for classification as a header. For example, the evaluation as to whether a font property meets one or more font criteria for classification as a header may be performed only for the most common font property in the text string. Additionally, or in the alternative, a set of font properties in the text string 108 that collectively meet the prevalence threshold may each be evaluated to determine whether each respective font property meets the one or more font criteria for classification as a header. The set of font properties may include the n-most common font properties that collectively meet the prevalence threshold. For example, for a prevalence threshold of 80%, the set of font properties may include one font property that is present in 70% of the elements in the text string 108 and an additional font property that is present in 20% of the elements in the text string 108. In this example, the two font properties may represent the most prevalent font properties in the text string 108. In this example, with since these two font properties meet the prevalence threshold, other font properties that may be present in the text string 108 may be excluded from the evaluation against the one or more font criteria for classification as a header.

iii. Header Formatting.

Referring further to FIGS. 1A and 1B, the data repository 102 may include tagged content 120. As shown in FIG. 1B, the tagged content 120 may include header-classified text strings 122 that represent text strings 108 that are classified as a header. The classification of a text string 108 as a header may also be indicated by a header classification indicator 114 associated with the text string 108 in the data corpus 106. The tagged content 120 may further include header tags 124 applied to the header-classified text strings 122. As shown in FIG. 1B, the tagged content 120 may include a plurality of header-classified text strings 122, and at least one header tag 124 respectively applied to each header-classified text strings 122. In one example, at least one first header tag 124a may be applied to a first header-classified text strings 122a. The first header-classified text strings 122a may correspond to the first text string 108a in the data corpus 106, which, as shown in FIG. 1B, is indicated as being classified as a header by the header classification indicator 114a. Additionally, or in the alternative, at least one additional header tag 124n may be applied to an additional header-classified text strings 122n. The additional header-classified text strings 122n may correspond to the fourth text string 108n in the data corpus 106, which, as shown in FIG. 1B, is indicated as being classified as a header by the fourth header classification indicator 114n.

In one example, the header tags 124 may be applied to text strings 108 (e.g., to header-classified text strings 122) based on a font prominence schedule 126. The font prominence schedule 126 may include a list of font properties sorted by order of prominence, and a corresponding tagging hierarchy for applying header tags 124 to header-classified text strings 122. Header-classified text strings 122 that have a different tagging hierarchy based on the font prominence schedule may receive a respectively different kind of header tag 124. A plurality of header-classified text strings 122 that have a common tagging hierarchy may respectively receive the same kind of header tag 124.

In one example, the header tags 124 may be applied to text strings 108 (e.g., to header-classified text strings 122) based on a header formatting schedule 128. The header formatting schedule 128 may include a list of a plurality of different header tags 124 and corresponding header formats. The header tags 124 in the header formatting schedule may be ordered according to increasing or decreasing prominence of the corresponding header format. The header tags 124 may be applied to the header-classified text strings 122 based on the tagging hierarchy from the font prominence schedule 128. In one example, the header tags 124 may be applied to the header-classified text strings 122 in order of increasing prominence, for example, based on the tagging hierarchy indicated from the font prominence in the font prominence in the font prominence schedule 128. Header tags 124 may be applied to the header-classified text strings 122 starting from the header tags 124 corresponding to a header format that has the lowest prominence in the header formatting schedule 128.

In one example, a group of header-classified text strings 122 may include one or more first text strings 108 at a first tagging hierarchy, one or more second text strings 108 at a second tagging hierarchy, and one or more third text strings 108 at a third tagging hierarchy. A header formatting schedule 128 may include as available header tags: <h1>, <h2>, <h3>, <h4>, <h5>, and <h6>. The header tag <h6> may be applied to the one or more third text strings 108 at the third tagging hierarchy, the header tag <h5> may be applied to the one or more second text strings 108 at the second tagging hierarchy, and the header tag <h4> may be applied to the one or more first text strings 108 at the first tagging hierarchy.

B. Header Management System Modules.

Referring again to FIG. 1A, example header management systems 104 are further described. As shown, a header management system 104 may include a partitioning module 130. The partitioning module 130 may perform partitioning operations upon the data corpus 106 that include partitioning at least a portion of the data corpus 106 into a plurality of text strings 108 for header classification.

In one example, at least a portion of the data corpus 106 may be partitioned, to provide a plurality of text strings 108, using at least one of a lexical analyzer and/or a parser. The lexical analyzer may convert a sequence of characters in the data corpus 106 into a sequence of lexical tokens. The lexical analyzer may utilize a lexical syntax that has a set of grammar rules that define a set of possible character sequences for a lexical token. The lexical syntax may correspond to a regular language. The grammar rules may include regular expressions.

In one example, the parser may build a data structure that includes the text strings 108. The data structure that includes the text strings 108 may be arranged in the form of a tree or other hierarchical structure. The parser may generate the text strings 108 directly or indirectly from content in the data corpus 106. For example, the parser may generate the text strings 108 from lexical tokens generated by the lexical analyzer. In one example, the partitioning module may transform content from the data corpus 106 that is configured according to a page description language into text strings 108 that are configured according to a markup language.

In one example, content in the data corpus 106 may be partitioned into a plurality of text strings 108 based on whitespace characters. For example, content in the data corpus 106 may include text characters and whitespace characters distributed throughout the text characters. The whitespace characters may represent spaces or line breaks, for example, between words, phrases, or sentences.

In one example, the lexical analyzer may generate a stream of lexical tokens delineated by whitespace characters. The parser may generate the text strings may identifying the whitespace characters in the stream of lexical tokens and parsing the lexical tokens into text strings 108 based on the location of the whitespace characters. In one example, the lexical analyzer may determine whether to generate a separate lexical token at a particular whitespace based on the lexical syntax. For example, the lexical syntax may include one or more grammar rules, based upon which the lexical analyzer may determine whether two strings of characters separated by a white space belong in the same lexical token or in separate lexical tokens. Additionally, or in the alternative, the parser may identify whitespace characters directly in the data corpus 106 and may generate the text strings 108 by parsing the data corpus based on the location of the whitespace characters in the data corpus 106.

The separation or partitioning of strings of characters into respective text strings may be based on lexical rules that are context-free or context-sensitive. A lexical rule that is context-free may determine whether and/or where to parse character strings (e.g., at a whitespace character) without considering a context of the character string relative to one or more upstream or downstream character strings. For example, a context-free lexical rule may parse character strings at whitespace characters that represent a character space following period or a line break. A lexical rule that is context-sensitive may determine whether and/or where to parse character strings (e.g., at a whitespace character) based at least in part on a context of the character string relative to one or more upstream or downstream character strings.

In one example, a parser that utilized a context-sensitive rule may hold a provisional lexical token in a buffer, and a context of a subsequent lexical token and the provisional lexical token relative to one another may be determined. If the character string represented by the provisional lexical token the character string represented by the subsequent lexical token are contextually unrelated, the provisional lexical token may be released from the buffer and a text string 108 may be generated based on the lexical token and added to the data structure. If the character string represented by the provisional lexical token and the character string represented by the subsequent lexical token are contextually related, the character strings may be concatenated and collectively held in the buffer until eventually being released from the buffer based on a subsequent lexical token representing a contextually unrelated string of characters. The contextual relatedness or unrelatedness may be determined, for example, based on one or more natural language processing operations. Such natural language processing operations may be based on lexical semantics, relational semantics, discourse semantics, or the like.

Referring further to FIG. 1A, a header management system 104 may include a group characteristics engine 132. The group characteristics engine 132 may perform operations upon the data corpus 106 associated with determining group characteristics of text strings 108 and/or evaluating text strings 108 against one or more group characteristic criteria 116, for example, to determine whether respective text strings 108 are eligible or disqualified from further evaluation against one or more font characteristics criteria 118 for classification as a header. The group characteristic engine 132 may generate group characteristic indicators 110 and associate the group characteristic indicators 110 with corresponding text strings 108.

In one example a header management system 104 may include a font characteristics engine 134. The font characteristics engine 134 may perform operations upon the data corpus 106 associated with determining font characteristics of text strings 108 and/or evaluating text strings 108 against one or more font characteristics criteria 118, for example, to determine whether respective text strings 108, such as text strings 108 that meet the one or more group characteristic criteria 116, are eligible or disqualified for classification as a header. The font characteristic engine 134 may generate font characteristic indicators 112 and associate the font characteristic indicators 112 with corresponding text strings 108. Additionally, or in the alternative, the font characteristic engine 134 may generate header classification indicators 114 and associate the header classification indicators 114 with corresponding text strings 108.

In one example, a header management system 104 may include a tagging module 136. The tagging module 136 may generate tagged content 120. The tagging module 136 may perform operations upon the data corpus 106 associated with determining what kind of header tags 124 are to be applied to header-classified text strings 122 and/or applying the header tags 124 to the header-classified text strings 122. In one example, the tagging module 136 may determine header tags for header-classified text strings 122 based on a predefined hierarchy for various prominent fonts. One example of a predefined hierarchy may include enlarged font size ranking above other prominent font properties, such as bold or italic font. As another example, prominent font properties that have the same font size may be ranked in the hierarchy based on order of occurrence (e.g., in a document or text string 108). Additionally, or in the alternative, the tagging module 136 may evaluate text strings 108 (e.g., header-classified text strings 122) against a font prominence schedule 126 to determine a tagging hierarchy for the text strings 108. Additionally, or in the alternative, the tagging module 136 may evaluate the tagging hierarchy for respective text strings 108 (e.g., header-classified text strings 122) against a header formatting schedule to determine what kind of header to apply to the respective text strings 108.

Referring further to FIG. 1A, a header management system 104 may receive inputs 106 from various sources and may generate outputs 108 to various sources. For example, the inputs 106 may include content from the data corpus 106, upon which the header management system 104 may execute operations, and the outputs 108 may include text strings 108 and/or tagged content 120. In one example, the outputs 108 may include group characteristic indicators 110, font characteristic indicators 112, and/or header classification indicators 114 generated and/or associated with header tags 108. Additionally, or in the alternative, the outputs 108 may include tagged content 120, such as header-classified text strings 122, and/or header tags associated with the header-classified text strings 122. Additionally, or in the alternative, the outputs 108 may include results generated by the header management system 104.

In one example, the inputs 106 may include queries upon which the header management system 104 may execute search operations, and the outputs 108 may include query results generated by the header management system 104. In one example, the queries and query results may represent question and answer pairs. Additionally, or in the alternative, the inputs 106 may include data from the data repository 102 and/or data transmitted to the header management system 104 from a source, such as data to be utilized by the header management system 104 for various operations, and/or data to be stored in the data repository 102. Additionally, or in the alternative, the outputs 108 may include data to be stored in the data repository 102 and/or data to be transmitted to a source, such as responsive to operations performed by header management system 104. By way of example, the source may include an external resource utilized by the header management system 104.

Referring again to FIG. 1A, the system 100 may include a user interface device 140 communicatively coupled or couplable with the header management system 104 and/or the data repository 102. The user interface may include hardware and/or software configured to facilitate interactions between a user and the header management system 104 and/or the data repository 102.

The system 100 may include a communications interface 142 communicatively coupled or couplable with the header management system 104 and/or the data repository 102. The communications interface 112 may include hardware and/or software configured to transmit data to and/or from the system 100, and or between respective components of the system 100. For example, the communications interface 112 may transmit and/or receive data between and/or among the header management system 104, the data repository 102, the user interface device 140, including transmitting and/or receiving inputs 106 and/or outputs 108.

3. System Operations

Figure 2:
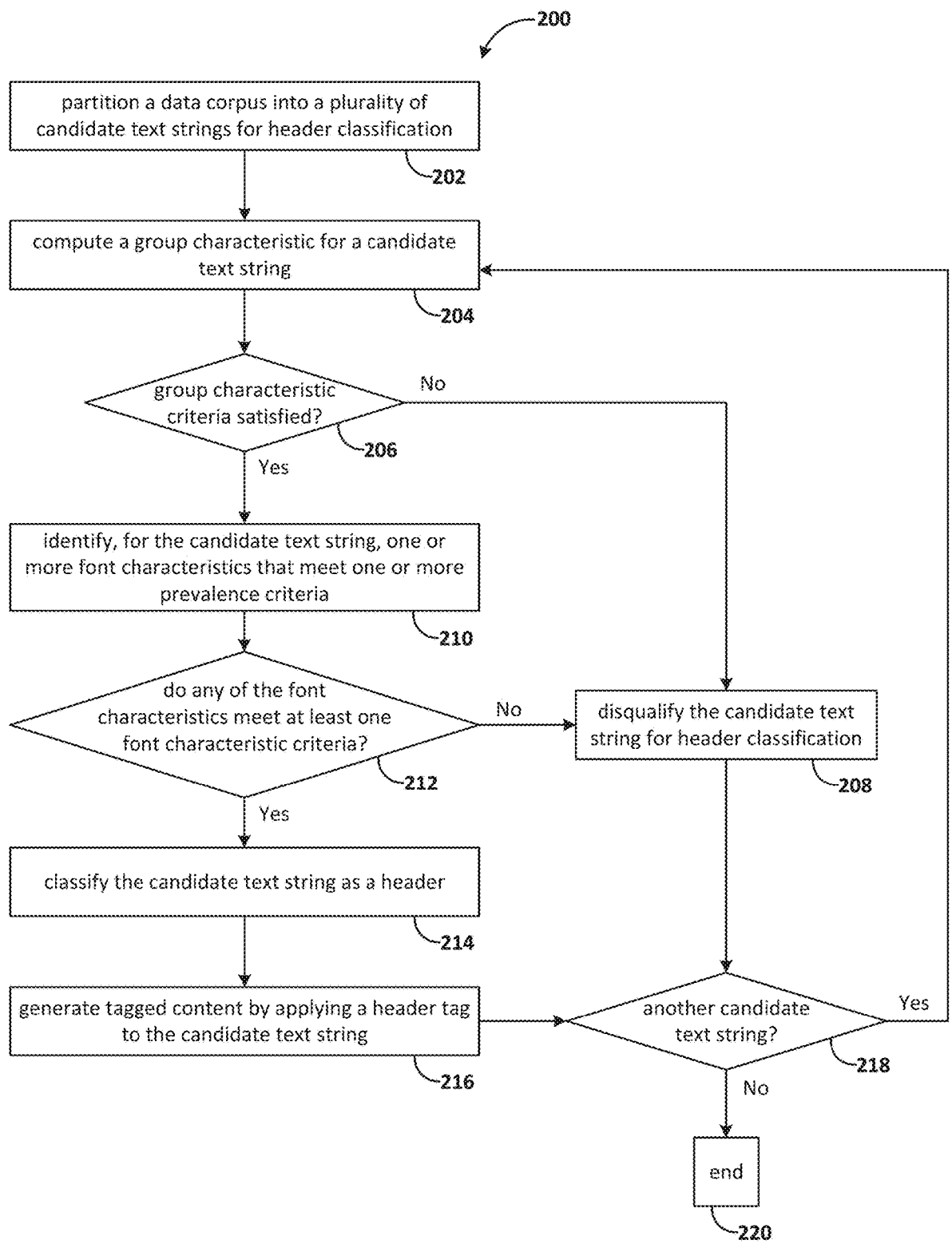
FIG. 2 illustrates example operations that may be performed by the system in accordance with one or more embodiments.

Referring now to FIG. 2, the presently disclosed subject matter is further described. The presently disclosed system 100 may perform operations 200. The operations 200 may be associated with the data repository 102 and/or the header management system 104. Various components of the system 100 may be utilized to perform the operations 200. The operations 200 may include one or more of: partitioning operations (e.g., partitioning the data corpus 106 and/or generating text strings 108), group characteristic operations (e.g., comparing group characteristics to group characteristic criteria 116 and/or generating group characteristic indicators 110), font characteristic operations (e.g., comparing font characteristics to font characteristic criteria 118 and generating font characteristic indicators 112), or tagging operations (e.g., generating header classification indicators 114 and/or generating tagged content 120).

In one example, the operations 200 may include receiving a query, and responsive to the query, rendering tagged content for display on a user interface device in a display format defined by header tags in the tagged content. In one example, one or more of the operations 200 described with reference to FIG. 2 may be performed responsive to a query. Additionally, or in the alternative, one or more of the operations 200 described with reference to FIG. 2 may be performed prior to receiving a query. For example, the tagged content may be generated prior to receiving a query.

As shown in FIG. 2, the operations 200 may include partitioning a data corpus into a plurality of candidate text strings for header classification, at block 202. The system 100 may identify content in the data corpus to be parsed, for example, by reference to file extensions. The system 100 may utilize one or more parsing tools to generate the candidate text strings. For example, the system may utilize at least one of a lexical analyzer and/or a parser. In one example, the data corpus may be partitioned into a plurality of candidate text strings based on a whitespace character preceding or following the candidate text strings.

Additionally, or in the alternative, the operations 200 may include different partitioning processes, such as different one-step partitioning processes, and/or a multi-step partitioning process. In one example, the operations 200 may include at least one of: fixed-length partitioning, section-based partitioning, clustering-based partitioning, or topic-based partitioning. In one example, a partitioning process may utilize topic modeling to identify main topics in a text and partition the text accordingly, for example, based on Latent Dirichlet Allocation (LDA) and/or Non-negative Matrix Factorization (NMF).

At block 204, the operations 200 may include computing one or more group characteristics for a candidate text string. The group characteristics may be computed by analyzing the candidate text string using an algorithm configured according to the group characteristic being computed.

In one example, for a group characteristic based on a total number of elements in a text string, the operations 200 may include executing programming logic to iterate through the text string and count each occurrence of the desired elements. For example, to count the number of characters in a text string, the operations 200 may include executing a loop to iterate through each character in the string and increment a counter for each character. To count the number of words in a text string, the operations 200 may include splitting the text string into words and counting the number of resulting elements.

In one example, for a group characteristic based on a kind of content within a text string, the operations 200 may include executing a pattern matching algorithm configured according to the kind of content to be identified. For example, the operations 200 may include identifying a marker associated with a kind of content. A list item may be identified by a marker such as a bullet point, a dash, a number, a letter, or the like. A hyperlink or hypertext may be identified by a URL, or an HTML tag.

At block 206, the operations 200 may include determining whether one or more group characteristic criteria are satisfied for the candidate text string. The determination as to whether a group characteristic criterion is satisfied may be performed by executing one or more logical operators, such as conditional statements, configured to compare a group characteristic to a group characteristic criterion. For a candidate text string that does not meet the one or more group characteristic criteria at block 206, the operations 200 may include disqualifying the candidate text string from header classification, at block 208. For a text string that satisfies the one or more group characteristic criteria, the operations 200 may proceed to block 210. In one example, the operations 200 may include disqualifying the candidate text string from header classification at block 208 if the candidate text string fails to meet at least one of the group characteristic criteria. For example, a candidate text string that meets one group characteristic criterion but fails to meet an additional group characteristic criterion may be disqualified from header classification at block 208. Additionally, or in the alternative, the operations 200 may proceed to block 210 for a text string that meets each one of a set of group characteristic criteria.

At block 210, the operations 200 may include identifying, for the candidate text string, one or more font characteristics that meet one or more prevalence criteria. The determination as to whether a font characteristic meets a prevalence criterion may be performed by executing one or more logical operators, such as conditional statements, configured to compare a prevalence of a font characteristic to a prevalence criterion.

The one or more font characteristics may be identified by executing logical operations configured according to the respective font characteristic. In one example, regular expressions may be configured to identify font properties encoded into a text string, such as in markups or formatting code. In one example, font characteristics may be identified using a text processing library. In one example, font characteristics may be identified using optical character recognition. In one example, font characteristics may be identified using a machine learning model that has been trained to recognize font characteristics in text, for example, based on shapes of letters in the text.

At block 212, the operations 200 may include determining whether any of the font characteristics of the candidate text string meet at least one font characteristic criteria. The determination as to whether a font characteristic criterion is satisfied may be performed by executing one or more logical operators, such as conditional statements, configured to compare a font characteristic to a font characteristic criterion.

For a candidate text string that has at least one font characteristic that meets at least one font characteristic criteria at block 212, the operations 200 may proceed to block 214. For a candidate text string that does not meet any of the font characteristic criteria at block 212, the operations 200 may include disqualifying the candidate text string from header classification, at block 208.

At block 214, the operations 200 may include classifying the candidate text string as a header responsive to determining, at block 212, that the candidate text string has at least one font characteristic that meets at least one font characteristic criteria. The candidate text string may be classified as a header by associating a header classification indicator with the text string.

At block 216, the operations 200 may include generating tagged content by applying a header tag to the candidate text string. The tagged content may be generated responsive to classifying the candidate text string as a header, at block 214. The header tag may be applied to the candidate text string using a markup language. The operations 200 may include executing programming language configured to add and/or manipulate markup language to apply header tags to candidate text strings. For example, the header tags may be added dynamically using a text string manipulation operation to insert opening and closing tags at appropriate locations in the text string. Additionally, or in the alternative, the operations 200 may include using syntax to define and add header tags to the candidate text strings.

Generating tagged content at block 216 may include one or more operations performed by the tagging module 136, such as determining a header tag to be applied to the candidate text strings and/or applying the header tag to the candidate text string. In one example, generating tagged content at block 216 may include determining a tagging hierarchy for the candidate text string. The tagging hierarchy may be determined based on a predefined hierarchy for various prominent font properties. Additionally, or in the alternative, the tagging hierarchy may be determined based on a font prominence schedule and/or a header formatting schedule. In one example, generating tagged content at block 216 may include determining a header tag to apply to the candidate text string. The header tag may be selected from a predefined set of header tags. Additionally, or in the alternative, the header tag may be selected based on a header formatting schedule. For example, the tagging hierarchy for the candidate text string may be compared to the header formatting schedule to determine the header tag corresponding to the tagging hierarchy for the candidate text string.

A header tag may be generated locally or globally. For a header tag generated locally, the header tag is applied to the candidate text string, while the original content from the data corpus, such as a document, remains unchanged by generating the tagged content. For a header tag generated locally, the tagged content may be generated within the data corpus, such as a document within the data corpus. For example, the tagged content generated by applying the header tag to the candidate text string may be inserted into the data corpus and may replace the original candidate text string partitioned from the data corpus and from which the tagged content was generated.

At block 218, the operations 200 may include determining whether there is another candidate text string for possible classification as a header. For example, the operations 200 may include determining whether there are additional candidate text strings in the data corpus to be classified. The operations 200 at block 218 may be performed responsive to generating tagged content at block 216, and/or responsive to disqualifying a candidate text string from header classification at block 208. If there is an additional candidate text string for classification, the operations 200 may return to block 204, where one or more group characteristics may be computed for the additional candidate text string. If there are no further candidate text strings for possible classification as a header, the operations 200 may conclude at block 220.

In one example, the operations 200 may include partitioning the data corpus into a plurality of candidate text strings that includes a first text string and a second text string. The first text string may include a first plurality of elements that respectively include a corresponding set of one or more words. The second text string may include a second plurality of elements that respectively include a corresponding set of one or more words. A first group characteristic may be computed for the first text string, and a second group characteristic may be computed for the second text string. The first group characteristic may include a numerical indication of the number of elements in the first plurality of elements, and the second group characteristic may include numerical indication of the number of elements in the second plurality of elements.

In one example, a group characteristic criterion may define a threshold number of elements for a text string. In one example, the first text string may be disqualified from header classification responsive to determining that the first group characteristic does not meet one or more group characteristic criteria, such as the group characteristic criterion that defines the threshold number of elements for a text string. In one example, the second group characteristic meets the one or more group characteristic criteria, such as the group characteristic criterion that defines the threshold number of elements for a text string.

In one example, responsive to determining that the second group characteristic meets the one or more group characteristic criteria, a font characteristic may be identified for the second text string that meets one or more prevalence criteria, and the font characteristic may be evaluated against one or more font characteristic criteria to determine whether the font characteristic meets at least one of the font characteristic criteria. In one example, the font characteristic of the second text string may meet at least one of the font characteristic criteria, and responsive to determining that least one of the font characteristic criteria is satisfied, the second text string may be classified as a header and tagged content may be generated for the second text string by applying a header tag to the second text string.

In one example, the plurality of candidate text strings may include a third text string that has a third group characteristic that meets the one or more group characteristic criteria, but that does not meet the one or more font characteristic criteria. The third candidate text string may be disqualified from header classification responsive to failing to meet the one or more font characteristic criteria.

Additionally, or in the alternative, the plurality of candidate text strings may include a third text string that is classified as a header, for example, responsive to meeting at least one of the font characteristic criteria. In one example, the operations 200 may include identifying a header formatting schedule that includes a first header format and a second header format, and in which the second header format is ordered above the first header format in the header formatting schedule. In one example, the first header format may be assigned to the second text string and the second header format may be assigned to the third text string.

In one example, the assignment of the first header format to the second text string and the second header format to the third text string may be based on the second text string having a smaller font size relative to the third text string. Additionally, or in the alternative, the assignment of the first header format to the second text string and the second header format to the third text string may be based on the second text string having a bold font style and the third text string having a larger font size relative to the second text string. Additionally, or in the alternative, the assignment of the first header format to the second text string and the second header format to the third text string may be based on the second text string having a color font style and the third text string having a bold font style. Additionally, or in the alternative, the assignment of the first header format to the second text string and the second header format to the third text string may be based on the second text string having an italic font style and the third text string having a bold font style.

In one example, the assignment of the first header format to the second text string and the second header format to the third text string may be based on a position of the second text string and the third text string in a font prominence hierarchy. The position of the second text string and the third text string may be based on respective font properties and corresponding positions in a font prominence hierarchy that represents an order of increasing font prominence. For example, the second text string may have a first position in the font prominence hierarchy based on at least one font property of the second text string, and the third text string may have a second position in the font prominence hierarchy based on at least one font property of the third text string. The second position in the font prominence hierarchy may be above the first position in the font prominence hierarchy.

In one example, header formats may be assigned to the second text string and the third text string according to a header formatting schedule. The header formats may be selected from the header formatting schedule for the second text string and the third text string based on their respective positions in the in the font prominence hierarchy. For example, a first header format from the header formatting schedule may be assigned assigning to the second text string, and a second header format from the header formatting schedule may be assigned to the third text string. The first header format may correspond to a particular header level in the header formatting schedule, and the second header format may correspond to an incremental step upwards from the particular header level in the header formatting schedule. In one example, a first tagged content may be generated for the second text string by applying a first header tag to the second text string corresponding to the first header format, and a second tagged content may be generated by applying a second header tag to the third text string corresponding to the second header format.

4. Header Management Interface

Referring now to FIGS. 3A-3D, examples of a header management interface (e.g., header management interfaces 300a-300d) are described. The header management interface may include one or more graphical user interfaces (GUI) configured to allow a user to provide inputs to the header management system 200, for example, using a user interface device 140 (FIG. 1A).

Figure 3A:
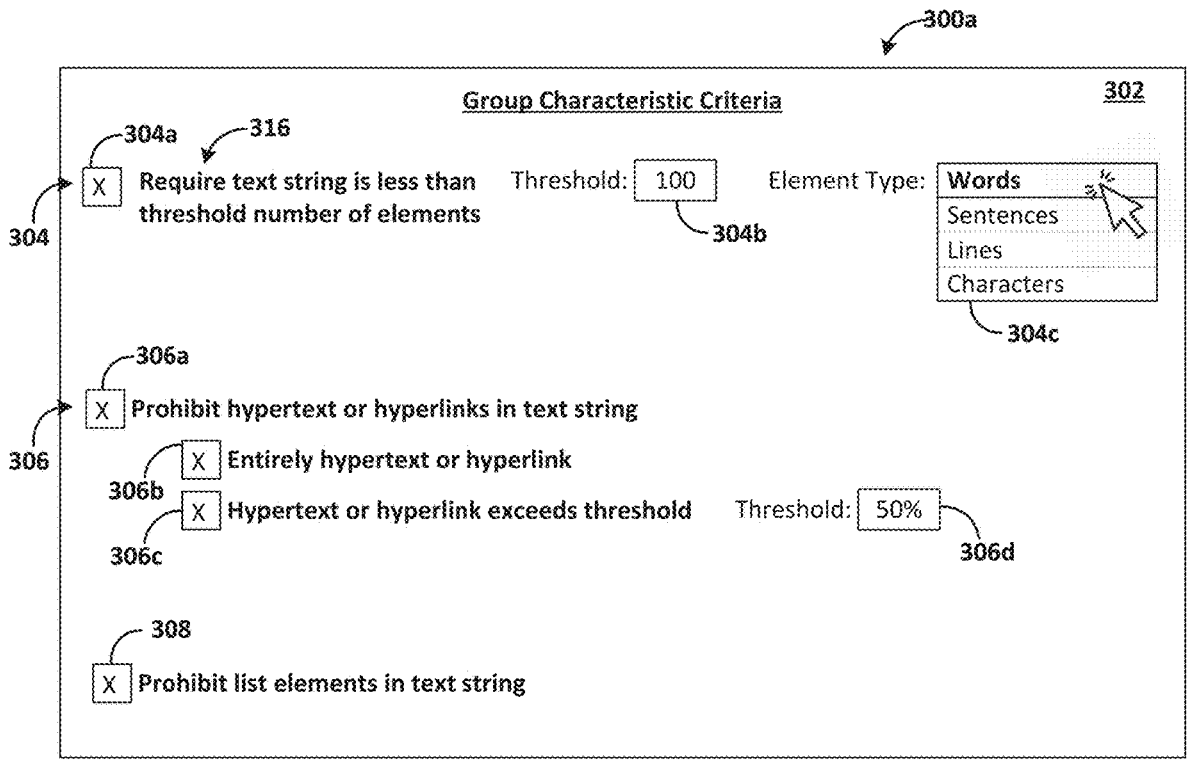
FIG. 3A illustrates a graphical user interface for defining group characteristic criteria for the header management system in accordance with one or more embodiments.

As shown in FIG. 3A, a header management interface 300a may include a group characteristic criteria interface 302. The group characteristic criteria interface 302 may be configured to allow a user to define one or more group characteristic criteria 316 that may be utilized by the header management system 200. As shown, the group characteristic criteria interface 302 may include one or more selectable elements for selecting group characteristic criteria 316.

In one example, the one or more selectable elements may include one or more first selectable elements 304 for selecting a group characteristic criterion 316 based on requiring a text string 108 to include a threshold number of elements to be classified as a header. The one or more first selectable elements 304 may include a first selection box 304a that is selectable to indicate whether to include a group characteristic criterion 316 based on a threshold number of elements. Additionally, or in the alternative, the one or more first selectable elements 304 may include a first input box 304b that is configured to receive an input representing the threshold number of elements. Additionally, or in the alternative, the one or more first selectable elements 304 may include a drop-down list 304c that is configured to receive a selection of the type of elements to be used for determining the threshold number of elements.

In one example, group characteristic criteria interface 302 may include one or more second selectable elements 306 for selecting a group characteristic criterion 316 based on prohibiting a text string 108 that includes hypertext or a hyperlink from being classified as a header. As shown, the one or more second selectable elements 308 may include a second selection box 306a that is selectable to indicate whether to include a group characteristic criterion 316 based on prohibiting hypertext or hyperlinks. Additionally, or in the alternative, the one or more second selectable elements 308 may include a third selection box 306b and/or a fourth selection box 306c that may be alternatively selectable to indicate whether to the prohibition on hypertext or hyperlinks is based on the text string being entirely a hypertext or hyperlink (selection box 306b) or based on a threshold (selection box 306c) such as a percentage of the text string 108. Additionally, or in the alternative, the one or more second selectable elements 308 may include a second input box 306d that is configured to receive an input representing the threshold percentage of a text string 108 that may be attributable to hypertext or a hyperlink.

In one example, group characteristic criteria interface 302 may include one or more third selectable elements 308 for selecting a group characteristic criterion 316 based on prohibiting a text string 108 that includes list elements from being classified as a header. As shown, the one or more second selectable elements 308 may include a selection box that is selectable to indicate whether to include a group characteristic criterion 316 based on prohibiting list elements.

Figure 3B:
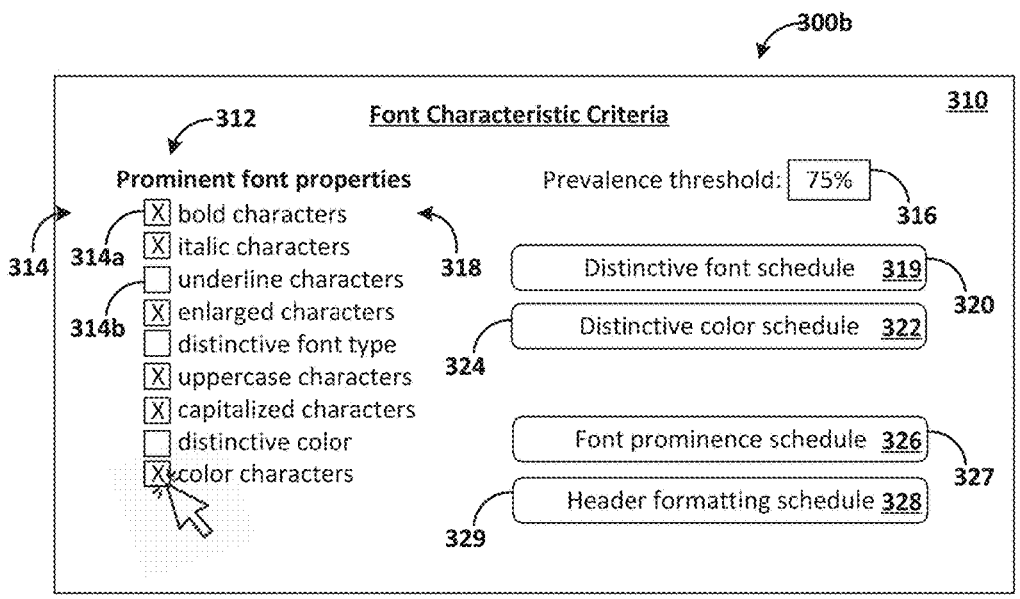
FIG. 3B illustrates a graphical user interface for defining font characteristic criteria for the header management system in accordance with one or more embodiments.

Referring now to FIG. 3B, a header management interface 300b may include a font characteristic criteria interface 310. The font characteristic criteria interface 310 may be configured to allow a user to define one or more font characteristic criteria 318 that may be utilized by the header management system 200. As shown, the font characteristic criteria interface 310 may include a set of prominent font properties 312 from which one or more prominent font properties may be selectable by a user for inclusion in a font characteristic criterion 318. A set of font property selection elements 314 may be respectively associated with a corresponding prominent font property of the set of prominent font properties 312. The user may select respective font property selection elements 314 to indicate which prominent font properties to include in the one or more font characteristic criteria 318. For example, as shown in FIG. 3B, a first font property selection element 314a corresponding to bold characters is selected for inclusion in a font characteristic criterion 318, and a second font property selection element 314b corresponding to underline characters is unselected and is therefore not included in the font characteristic criterion 318. In one example, the font characteristic criteria interface 310 may include a prevalence threshold input box 316 that is configured to receive an input representing the prevalence threshold for evaluating the prominent font properties according to the one or more font characteristic criteria 318.

In one example, the font characteristic criteria interface 310 may be configured to allow a user to interact with a distinctive font schedule 319, such as to define font types that are to be considered distinctive or indistinctive for a font characteristic criterion 318 based on distinctive font. The distinctive font schedule 319 may be accessible by a first selection button 320.

In one example, the font characteristic criteria interface 310 may be configured to allow a user to interact with a distinctive color schedule 322, such as to define colors that are to be considered distinctive or indistinctive for a font characteristic criterion 318 based on distinctive color. The distinctive color schedule 322 may be accessible by a second selection button 324.

In one example, the font characteristic criteria interface 310 may be configured to allow a user to interact with a font prominence schedule 326, such as to define a list of font properties sorted by order of prominence, and a corresponding tagging hierarchy for applying header tags 124 to header-classified text strings 122. The font prominence schedule 326 may be accessible by a third selection button 327.

In one example, the font characteristic criteria interface 310 may be configured to allow a user to interact with a header formatting schedule 128, such as to define formats for header tags to be applied to the header-classified text strings 122. The header formatting schedule 128 may be accessible by a fourth selection button 329.

Figure 3C:
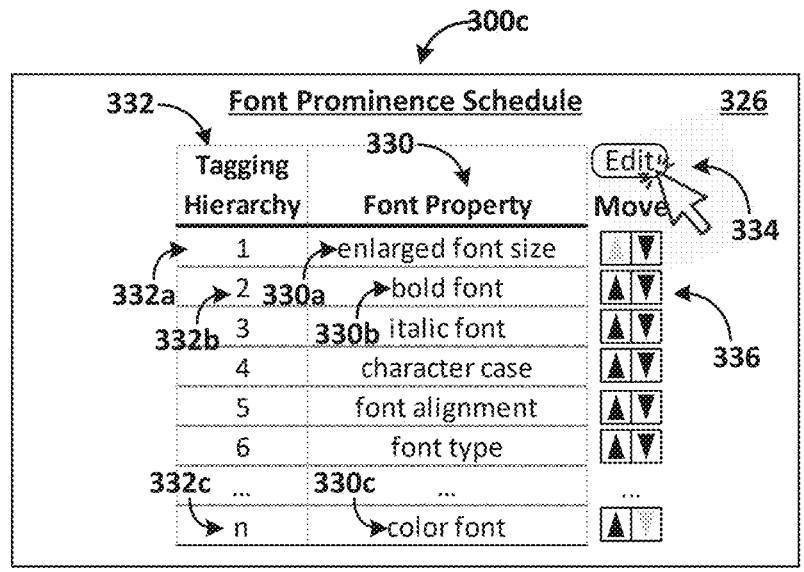
FIG. 3C illustrates an example font prominence schedule that may be utilized by the header management system in accordance with one or more embodiments.

Referring to FIG. 3C, a header management interface 300c may include a font prominence schedule 326. As shown in FIG. 3C, a font prominence schedule 326 may include a plurality of font properties 330 sorted by order of prominence, and a corresponding tagging hierarchy 332. Text strings that are classified as a header based on a respective font property 330 in the font prominence schedule 326 may be assigned a tagging hierarchy 332 corresponding to the respective font property 330. In one example, as shown in FIG. 3C, a first font property 330a for enlarged font size may correspond to a first tagging hierarchy 332a. The first tagging hierarchy 332a may correspond to a first level, such as a highest level, in the tagging hierarchy 332. In one example, a second font property 330b for bold font may correspond to a second tagging hierarchy 332b. The second tagging hierarchy 332b may correspond to a second level in the tagging hierarchy 332. In one example, a third font property 330c for color font may correspond to a third tagging hierarchy 332c. The third tagging hierarchy 332c may correspond to a third level, such as a lowest level, in the tagging hierarchy 332.

In one example, various font properties 330 may be added or removed from the font prominence schedule 326. For example, a user may select an edit button 334 to add or remove a font property 330. In one example, the order of prominence of the font properties 330 in the prominent font schedule 326 may be modified. For example, a user may move various font properties 330 up or down in the prominent font schedule 326 using up/down buttons 336.

Figure 3D:
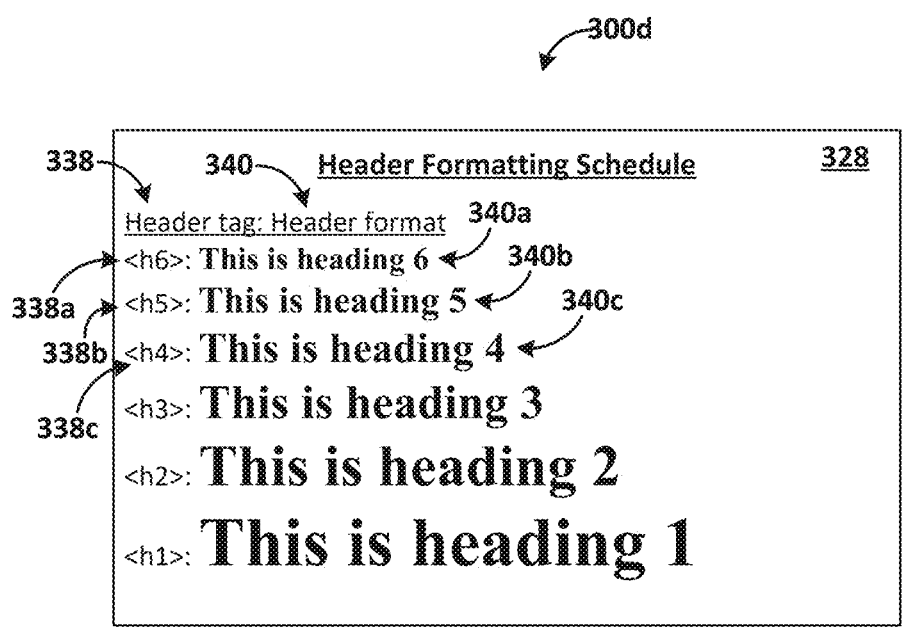
FIG. 3D illustrates an example header formatting schedule that may be utilized by the header management system in accordance with one or more embodiments.

Referring to FIG. 3D, a header management interface 300d may include a header formatting schedule 328. As shown in FIG. 3D, a header formatting schedule 328 may include a plurality of header tag types 338 and a corresponding header format 340. The header tag types 338 may be sorted by order of increasing prominence. Header tag types 338 from the header formatting schedule 328 may be selected for header-classified text strings according to the tagging hierarchy 332 determined from the font prominence schedule 326 in order of increasing prominence.

In one example, a first header tag type 338a in the header formatting schedule 328 may be applied to one or more header-classified text strings corresponding to the third tagging hierarchy 332c based on color font in the font prominence schedule 326. The third header tag type 338a may provide for a corresponding first header format 340a. The first header tag type 338a and the first header format 340a may correspond to a particular level prominence in the header formatting schedule 328.

In one example, a second header tag type 338b in the header formatting schedule 328 may be applied to one or more header-classified text strings corresponding to the second tagging hierarchy 332b based on bold font in the font prominence schedule 326. The second header tag type 338b may provide for a corresponding second header format 340b. The second header tag type 338b and the second header format 340b may correspond to an incremental step upwards from the particular level in the header formatting schedule 328.

In one example, a third header tag type 338c in the header formatting schedule 328 may be applied to one or more header-classified text strings corresponding to the first tagging hierarchy 332a based on enlarged font size in the font prominence schedule 326. The third header tag type 338c may provide for a corresponding third header format 340c. The third header tag type 338c and the third header format 340c may correspond to an incremental step upwards from the previous level in the header formatting schedule 328 applied to header-classified text strings corresponding to an incremental step down in the tagging hierarchy 332.

5. Practical Applications, Advantages & Improvements

Referring now to FIG. 4A-4D example operations 200 applied to content in a data corpus 406 are further described. As shown, the data corpus 406 may include one or more documents 400. The documents 400 may be partitioned into a plurality of text strings 408.

Figure 4A:
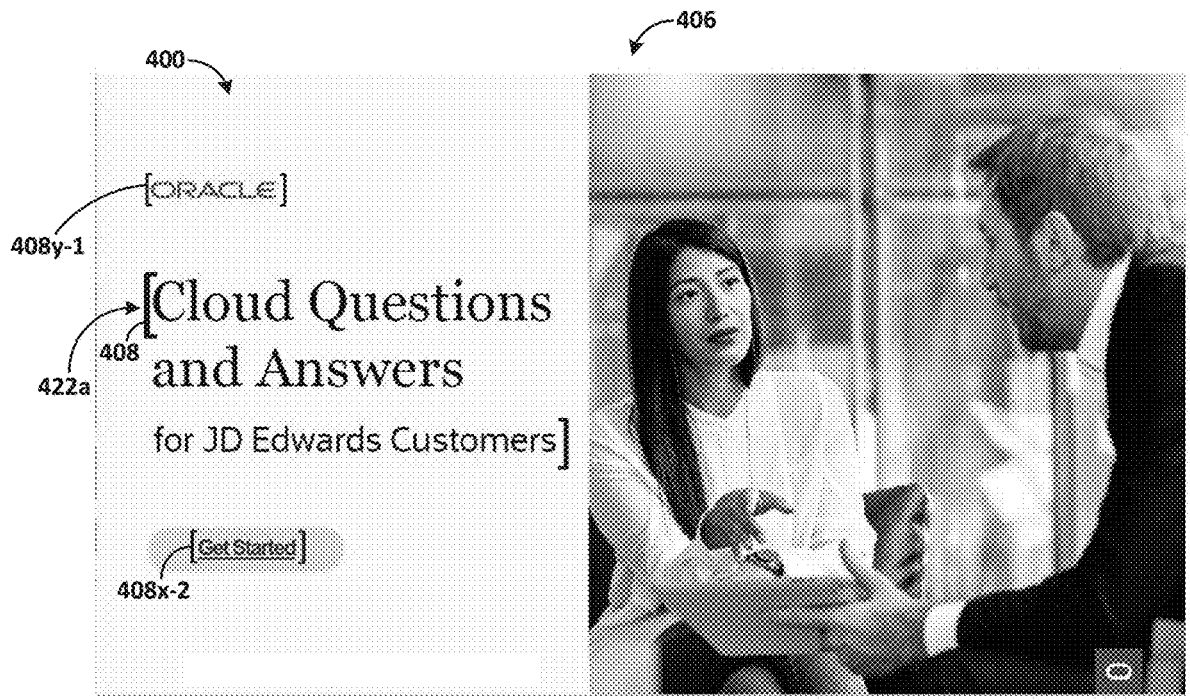
FIGS. 4A-4D illustrate an example data corpus and example partitioning operations that may be performed on the data corpus in accordance with one or more embodiments.
Figure 4B:
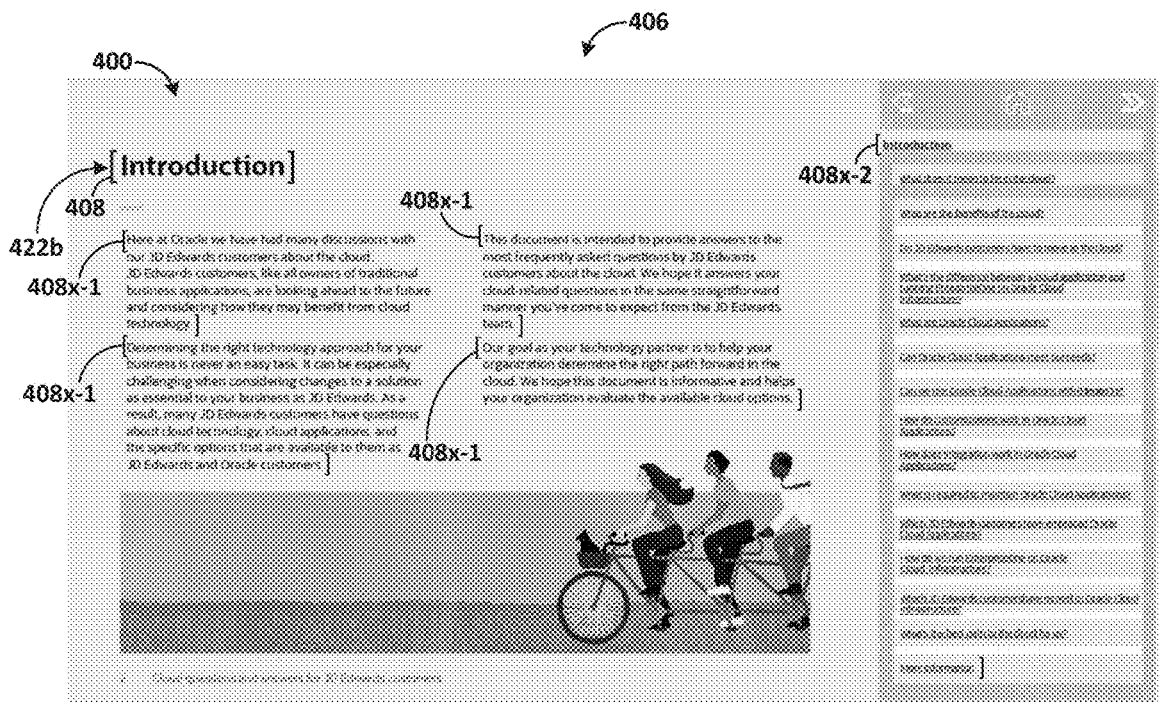
Figure 4C:
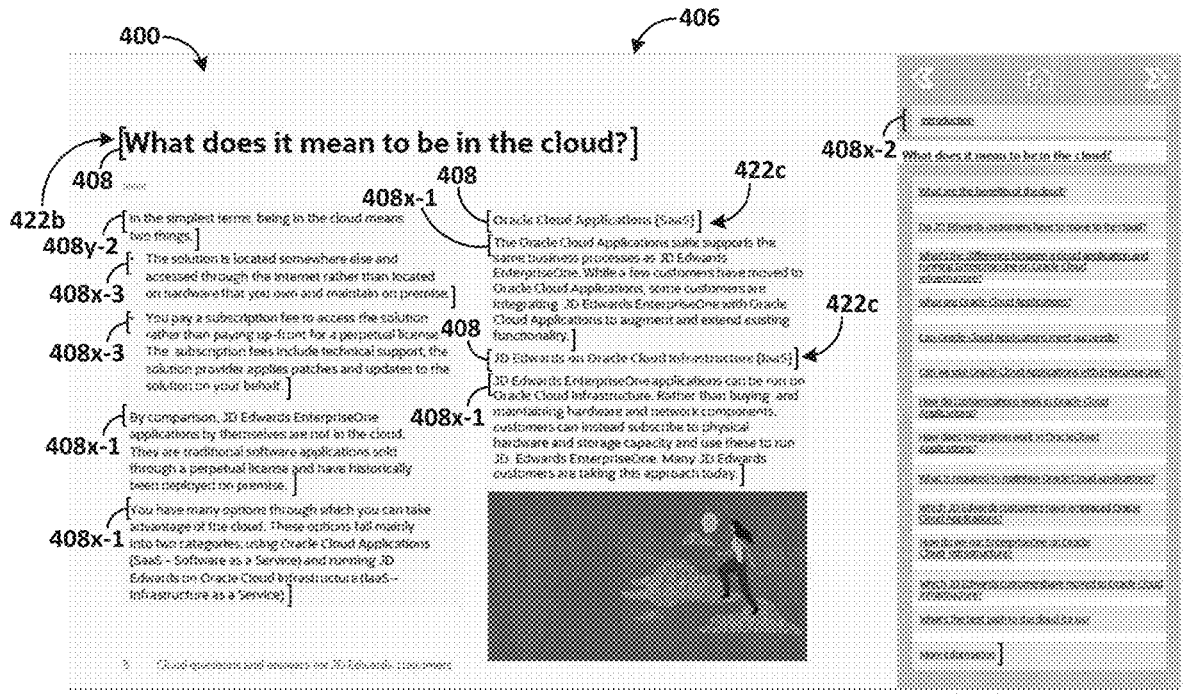
Figure 4D:
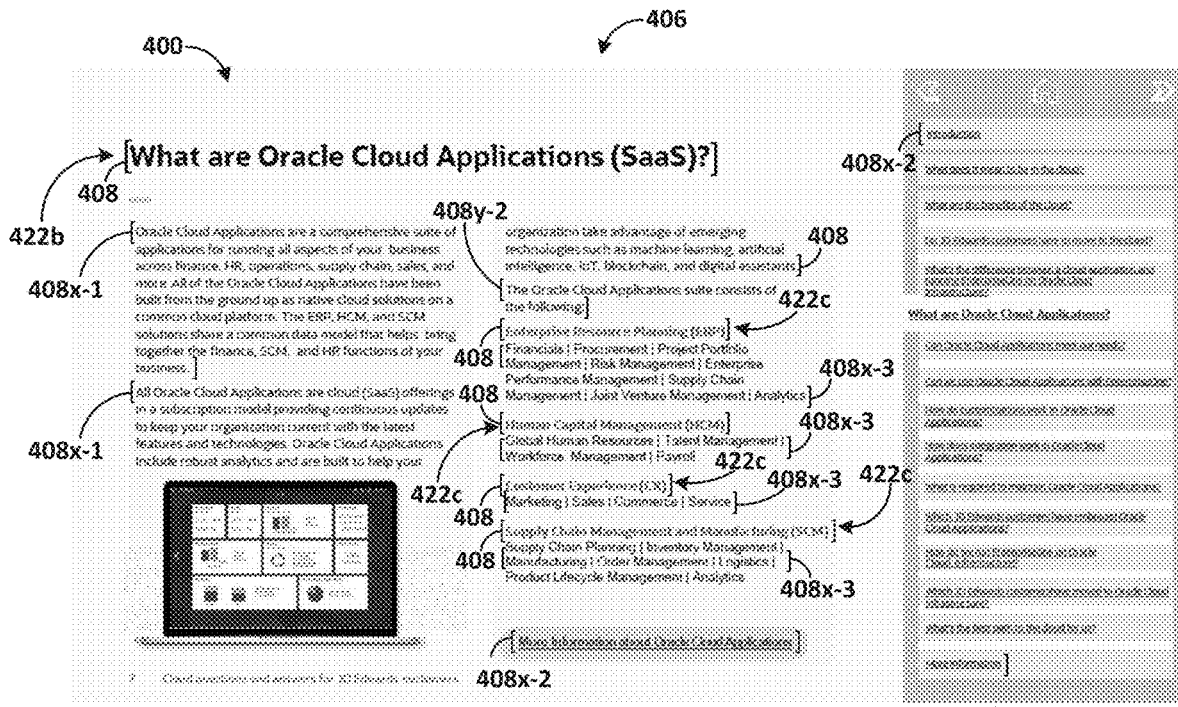

In one example, the plurality of text strings 408 may include one or more group-disqualified text strings 408x that are disqualified from classification as a header based on one or more group characteristic criteria. As shown in FIGS. 4B-4D, the one or more group-disqualified disqualified text strings 408x may include threshold element-disqualified text strings 408x-1 that are disqualified from classification as header based on a group characteristic criterion that requires a text string 408 to be within a threshold number of elements for classification as a header. Additionally, or in the alternative, as shown in FIGS. 4A-4D, the one or more group-disqualified disqualified text strings 408x may include hypertext-disqualified text strings 408x-2 that are disqualified from classification as header based on a group characteristic criterion that prohibits a text string 408 from including hypertext or a hyperlink Additionally, or in the alternative, as shown in FIG. 4C, the one or more group-disqualified disqualified text strings 408x may include list-disqualified text strings 408x-3 that are disqualified from classification as header based on a group characteristic criterion that prohibits a text string 408 from including a list element.

In one example, the plurality of text strings 408 may include one or more font-disqualified text strings 408y that are disqualified from classification as a header based on one or more font characteristic criteria. The one or more font-disqualified text strings 408y may represent text strings 408 that are disqualified from classification as header based on one or more font properties that do not meet a font characteristic criterion based on distinctive font type. In one example, as shown in FIG. 4A, a first font-disqualified text string 408y-1 may be disqualified for having a distinctive font that is not included in a distinctive font schedule. In one example, as shown in FIGS. 4C and 4D, one or more second font-disqualified text strings 408y-2 may be disqualified for lacking a prominent font property.

In one example, as shown in FIG. 4A, the plurality of text strings 408 may include one or more header-classified text strings 422 that represent text strings 408 that are classified as a header. The one or more header-classified text strings 422 may include a one or more first header-classified text strings 422a. The one or more first header-classified text strings 422a may be classified as a header based on a font characteristic criterion that classifies text strings 408 with enlarged font as a header. The one or more first header-classified text strings 422a may respectively have a first font property 330a (FIG. 3C) for enlarged font size that corresponds to a first tagging hierarchy 332a (FIG. 3C).

In one example, as shown in FIGS. 4B-4D, the one or more header-classified text strings 422 may include a one or more second header-classified text strings 422b. The one or more second header-classified text strings 422b may be classified as a header based on a font characteristic criterion that classifies text strings 408 with bold font as a header. The one or more second header-classified text strings 422b may respectively have a second font property 330b (FIG. 3C) for bold font that corresponds to a second tagging hierarchy 332b (FIG. 3C).

In one example, as shown in FIGS. 4C and 4D, the one or more header-classified text strings 422 may include a one or more third header-classified text strings 422c. The one or more third header-classified text strings 422c may be classified as a header based on a font characteristic criterion that classifies text strings 408 with color font as a header. The one or more third header-classified text strings 422c may respectively have a third font property 330c (FIG. 3C) for color font that corresponds to a third tagging hierarchy 332c (FIG. 3C).

Figure 5A:
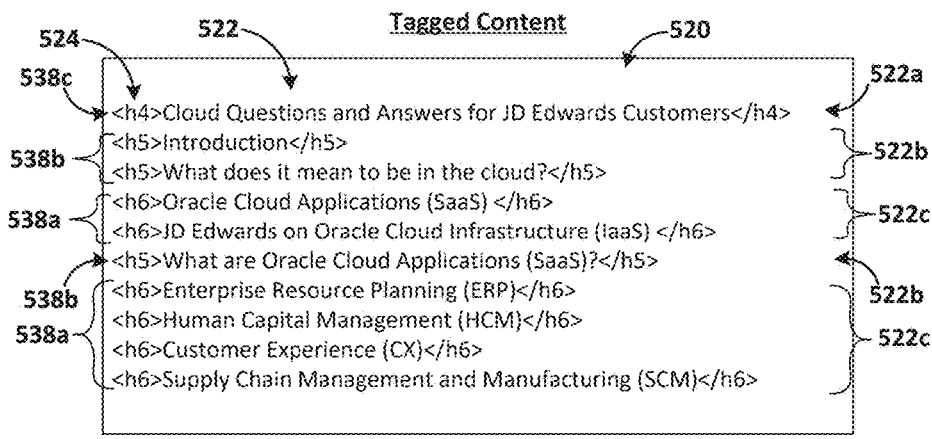
FIG. 5A illustrates example tagged content generated by the header management system in accordance with one or more embodiments.

Referring now to FIGS. 5A-5D, example tagged content 520 is further described. The tagged content described with reference to FIGS. 5A-5D may represent locally-generated or globally-generated tagged content. As shown in FIG. 5A, tagged content may be generated based on one or more header-classified text strings 522, such as the header-classified text strings 522 described with reference to FIGS. 4A-4D. The tagged content may include a plurality of header tags 524 respectively associated with a corresponding header-classified text string 522. The tagged content may include header tags 524 corresponding to one of a plurality of header tag types 538, as indicated, for example, in a header formatting schedule 528. The header tags 524 may respectively have a header format 540 corresponding to the header tag type, as indicated, for example, in the header formatting schedule.

Figure 5B:
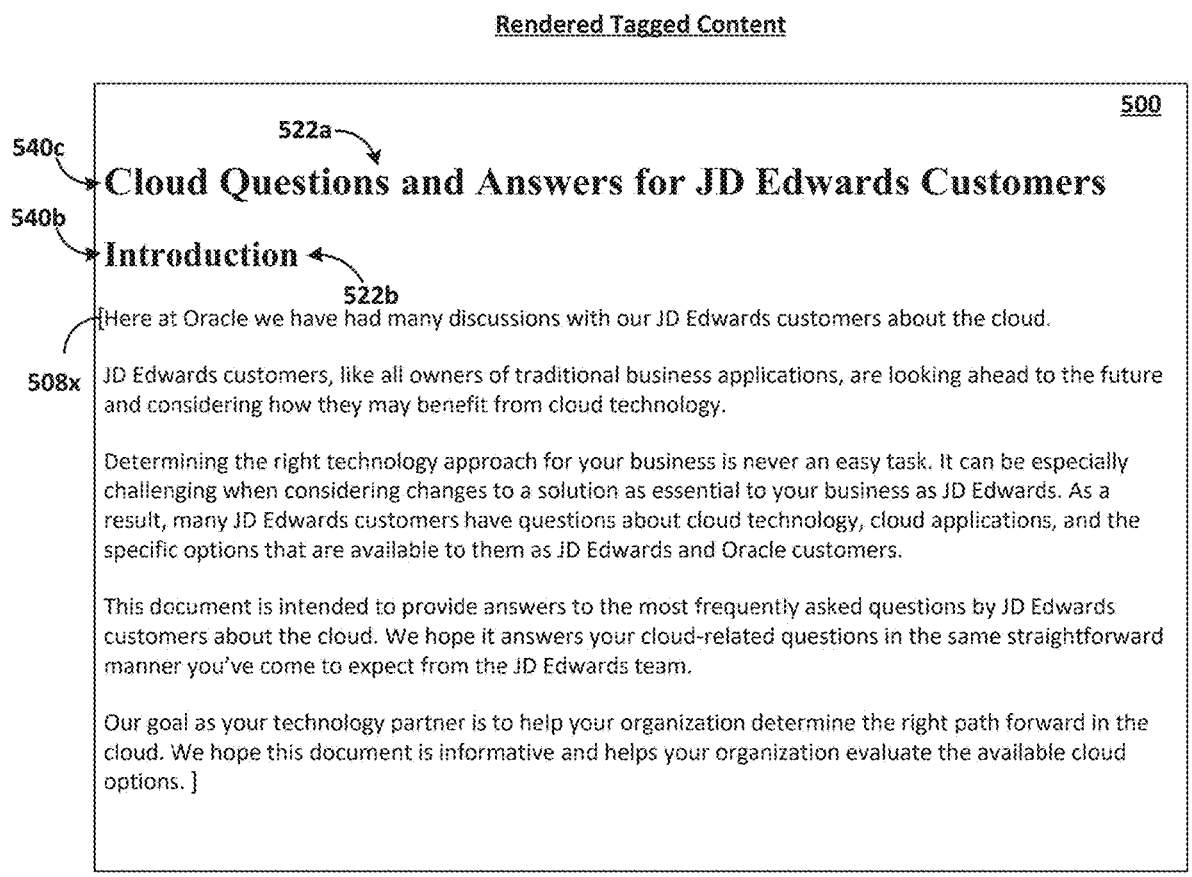
Figure 5D:
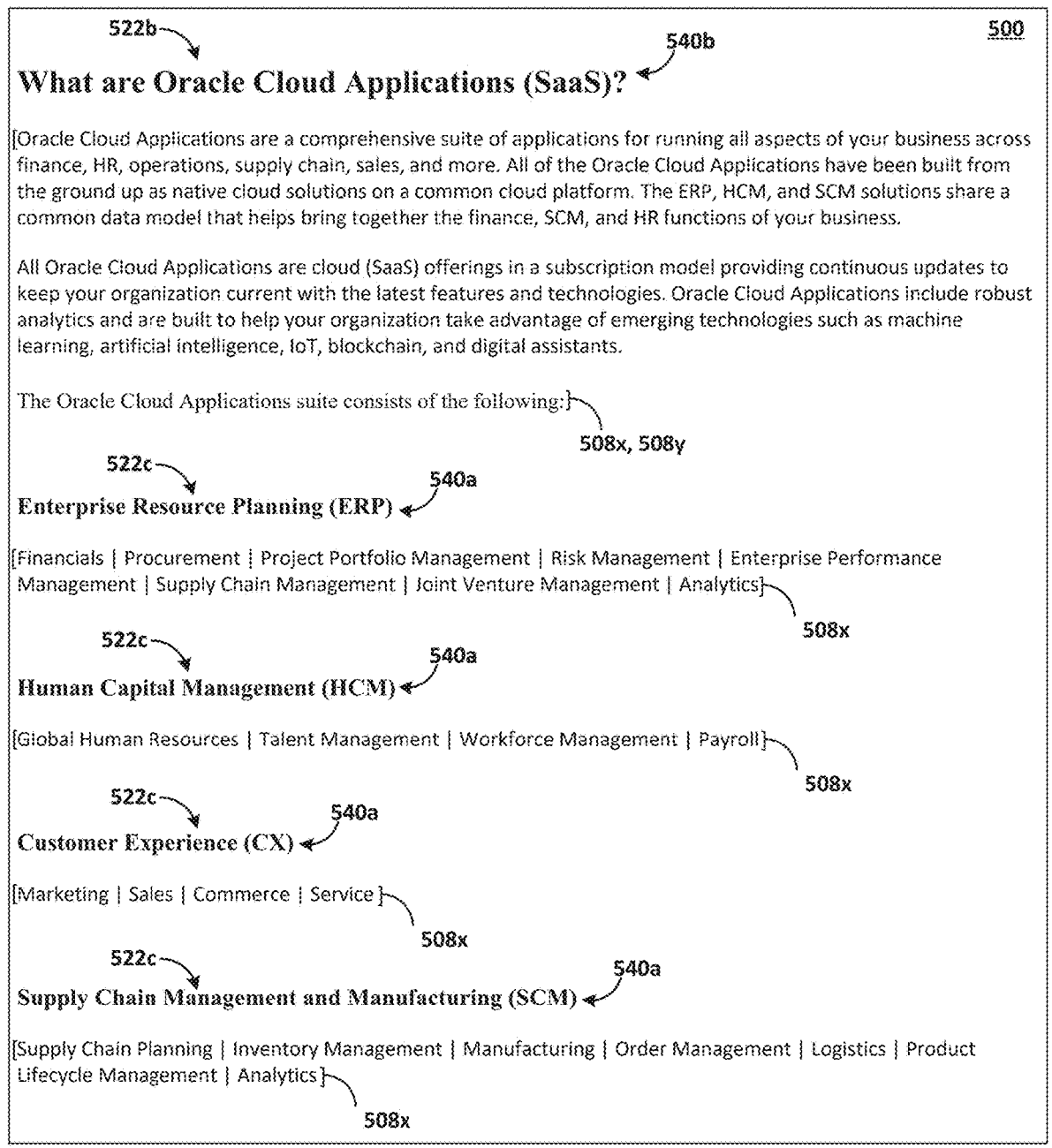

As shown in FIGS. 5B-5D, the tagged content may be rendered in connection with associated content from the data corpus. For example, rendered tagged content 500 may include one or more header-classified text strings 522 and one or more disqualified text strings 508x, 508y, with the one or more header-classified text strings 522 respectively serving as headings or subheadings for a corresponding one or more disqualified text strings 508x, 508y.

In one example, the rendered tagged content 500 may include one or more third header-classified text strings 522c. The one or more third header-classified text strings 522c may have a first header tag type 538a corresponding to a first header format 540a. As shown in FIG. 5A, the first header tag type 538a may be an <h6> header tag. As shown in FIGS. 5C and 5D, the first header format 540a may cause the one or more third header-classified text strings 522c to render as 12-point bold font.

In one example, the rendered tagged content 500 may include one or more second header-classified text strings 522b. The one or more second header-classified text strings 522b may have a second header tag type 538b corresponding to a second header format 540b. As shown in FIG. 5A, the second header tag type 538b may be an <h5> header tag. As shown in FIGS. 5B-5D, the second header format 540b may cause the one or more second header-classified text strings 522b to render as 16-point bold font.

In one example, the rendered tagged content 500 may include one or more first header-classified text strings 522a. The one or more first header-classified text strings 522a may have a third header tag type 538c corresponding to a third header format 540c. As shown in FIG. 5A, the third header tag type 538c may be an <h4> header tag. As shown in FIG. 5B, the third header format 540c may cause the one or more first header-classified text strings 522a to render as 18-point bold font.

Advantageously, the presently disclosed systems and operations provide improvements to header management technology. These improvements include more accurate and/or more efficient identification of headers within a data corpus, and the ability to provide tagged content that includes desired header types. The tagged content may advantageously provide consistent and/or uniform header formatting across content in the data corpus that has varying font properties. The consistent and/or uniform header formatting may improve user experiences with rendered tagged content, including, for example, improved readability of the rendered content. For example, the presently disclosed systems and operations may provide improved structure and organization to electronically displayed content, making the content easier for users to navigate and understand information presented in the content. For example, text strings from different data sources or documents in the data corpus may be rendered with consistent and/or uniform header formatting even when the different data sources or documents have respectively different font properties. This consistent and/or uniform header formatting allows users to recognize that related content from the different data sources or documents is intended to be grouped together.

Further, the presently disclosed systems and operations provide improvements to assistive technology that utilizes header tags for accessibility. For example, header tags may be used by assistive technologies such as screen readers. The consistent and/or uniform header formatting provided by the presently disclosed systems and methods allow the assistive technology to provide clear and consistent way to navigate for users who rely on the assistive technology to access content in a data corpus. These improvements are particularly important for users when accessing content in a data corpus from different data sources or documents that have respectively different font properties.

Further, the presently disclosed systems and operations provide improvements to computer technology, including, for example, improved processing speed and/or reduced processing demands associated with adding header tags to content in a data corpus. The presently disclosed systems and operations may further provide improved data structures for generating and/or storing tagged content. For example, improved data structures are provided for associating text strings with various indicators, such as group characteristic indicators, font characteristic indicators, and/or header classification indicators. Further, these improved data structures may improve tagging operations, including generating and/or storing tagged content.

Further, the presently disclosed systems and operations provide improvements to search engine optimization (SEO) systems. SEO systems utilize header tags to understand the structure and hierarchy of content in a data corpus. The improved header management technology allows SEO system to more accurately and/or efficiently crawl and rank content in a data corpus. Improved SEO of content in a data corpus, in turn, allows search engine to more accurately and/or efficiently locate relevant content in the data corpus, for example, in response to queries. As a result, query results may be returned more quickly, and with better content quality based on the presently disclosed systems and operations.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 6:
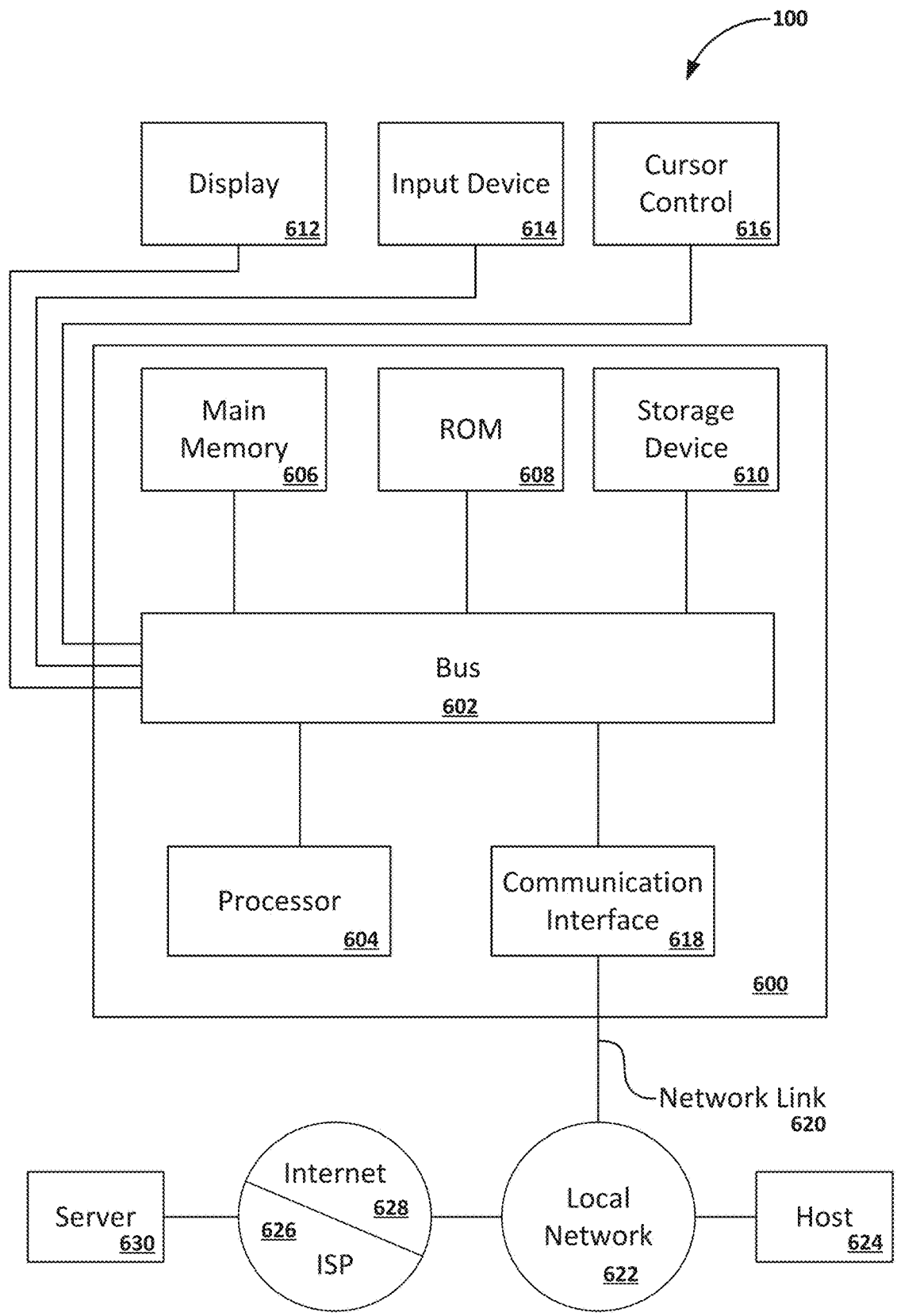
FIG. 6 shows a block diagram that illustrates a computer system in accordance with one or more embodiments.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general-purpose microprocessor.

Computer system 600 also includes a main memory 606, such as a random-access memory (RAM) or other dynamic storage device, coupled to bus 602 for storing information and instructions to be executed by processor 604. Main memory 606 also may be used for storing temporary data or other intermediate information during execution of instructions to be executed by processor 604. Such instructions, when stored in non-transitory storage media accessible to processor 604, transform the computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic, or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic, or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

7. Computer Networks and Cloud Networks

In one or more embodiments, the PR system is connected to, or distributed across, a computer network. The computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use the same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with the same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with the same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets received from the source device are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media comprising computer-executable instructions that, when executed by one or more processors, cause performance of operations, comprising:
   identifying, in a data corpus, a first candidate text string for header classification;
   determining a first font of the first candidate text string;
   classifying the first candidate text string as a first header based at least in part on a first evaluation of the first font of the first candidate text string relative to one or more additional text strings in the data corpus;
   applying, to the first header, a first header tag at least in part responsive to classifying the first candidate text string as the first header;
   rendering the first header for display as a heading for a first set of related text strings in the data corpus.

2. The one or more non-transitory computer-readable media of claim 1, wherein classifying the first candidate text string as the first header based at least in part on the first evaluation of the first font comprises:
   evaluating a first prominence of the first font of the first candidate text string relative to one or more additional text strings in the data corpus;
   classifying the first candidate text string as the first header based at least in part on the first prominence of the first font of the first candidate text string relative to one or more additional text strings in the data corpus.

3. The one or more non-transitory computer-readable media of claim 2, wherein the operations further comprise:
   identifying, in the data corpus, a second candidate text string for header classification;
   classifying the second candidate text string as a second header based at least in part on a second prominence of a second font of the second candidate text string;
   assigning, to the first header, a first header format based at least in part on the first prominence of the first font relative to the second prominence of the second font;
   selecting the first header tag for the first header based at least in part on the first header format corresponding to the first header.

4. The one or more non-transitory computer-readable media of claim 3, wherein the operations further comprise:
   determining, for the first header, a first position in a font prominence hierarchy based at least in part on the first font;
   determining, for the second header, a second position in the font prominence hierarchy based at least in part on the second font;
   assigning to the second header, a second header format based at least in part on the second position in the font prominence hierarchy relative to the first position in the font prominence hierarchy.

5. The one or more non-transitory computer-readable media of claim 4, wherein the operations further comprise:
   based at least on a difference in prominence between the first candidate text string and the second candidate text string, determining that the first candidate text string is a first heading and determining that the second candidate text string is a subheading under the first heading;
   applying, to the second header, a second header tag corresponding to the second header format;
   rendering the second header for display as the subheading for a second set of related text strings in the data corpus.

6. The one or more non-transitory computer-readable media of claim 4, wherein the operations further comprise:
   assigning to the first header, the first header format from a header formatting schedule based at least in part on the first position in the font prominence hierarchy relative to the second position in the font prominence hierarchy,
   wherein the first header format corresponds to a particular header level in the header formatting schedule, and wherein the second header format corresponds to an incremental step from the particular header level in the header formatting schedule.

7. The one or more non-transitory computer-readable media of claim 4, wherein the font prominence hierarchy comprises an order of prominence for at least two of: a bold font style, an italic font style, a first font size, a second font size, a first font type, a second font type, a first font case, a second font case, a first font color, or a second font color.

8. The one or more non-transitory computer-readable media of claim 2, wherein the operations further comprise:
   assigning, to the first header, a first header format based at least in part on the first prominence of the first font;
   selecting the first header tag for the first header based at least in part on the first header format corresponding to the first header, wherein the first header format comprises one or more font characteristics that differ from the first font.

9. The one or more non-transitory computer-readable media of claim 2, wherein the operations further comprise:
   identifying, in the data corpus, a second candidate text string for header classification;
   computing, for the second candidate text string, a group characteristic comprising a number of elements in the second candidate text string;
   determining that the group characteristic meets a set of one or more group characteristic criteria;
   classifying the second candidate text string as a second header at least in part responsive to determining that the group characteristic meets the set of one or more group characteristic criteria.

10. The one or more non-transitory computer-readable media of claim 9, wherein the operations further comprise:
    responsive to determining that the group characteristic meets the set of one or more group characteristic criteria:
       identifying, for the second candidate text string, a font characteristic that meets a set of one or more prevalence criteria;
       determining that the font characteristic meets a set of one or more font characteristic criteria;
       classifying the second candidate text string as the second header at least in part responsive to determining that the font characteristic meets the set of one or more font characteristic criteria.

11. The one or more non-transitory computer-readable media of claim 10,
    wherein the set of one or more prevalence criteria comprises a prevalence threshold for the font characteristic,
    wherein the prevalence threshold comprises a threshold number of elements that exhibit the font characteristic.

12. The one or more non-transitory computer-readable media of claim 10, wherein the font characteristic comprises at least one of: bold characters, italic characters, underline characters, enlarged characters relative to a size threshold, a distinctive font type according to a distinctive font schedule, uppercase characters, capitalized characters, color characters, or a distinctive color according to a difference in Euclidean distance between color tuples.

13. The one or more non-transitory computer-readable media of claim 9, wherein determining that the group characteristic meets the set of one or more group characteristic criteria comprises at least one of:
   determining that a first number of elements in the second candidate text string meets a threshold number of elements, or
   determining that a kind of content in the second candidate text string meets a set of one or more content criteria.

14. The one or more non-transitory computer-readable media of claim 1, wherein the operations further comprise:
   identifying, in the data corpus, a second candidate text string for header classification;
   computing a group characteristic for the second candidate text string;
   determining that a set of one or more group characteristic criteria are unmet by the group characteristic;
   disqualifying the second candidate text string for header classification responsive to determining that the set of one or more group characteristic criteria are unmet by the group characteristic.

15. The one or more non-transitory computer-readable media of claim 14, wherein the operations further comprise:
   identifying, in the data corpus, a third candidate text string for header classification;
   identifying, for the third candidate text string, a font characteristic that meets a set of one or more prevalence criteria;
   determining that a set of one or more font characteristic criteria are unmet by the font characteristic;
   disqualifying the third candidate text string for header classification responsive to determining that the set of one or more font characteristic criteria are unmet by the font characteristic.

16. The one or more non-transitory computer-readable media of claim 1, wherein the operations further comprise:
   partitioning the data corpus into a plurality of candidate text strings based on a set of one or more lexical rules, wherein the set of one or more lexical rules comprises:
      at least one context-free lexical rule, or at least one context-sensitive lexical rule.

17. The one or more non-transitory computer-readable media of claim 16, wherein partitioning the data corpus into the plurality of candidate text strings comprises:
   parsing content configured according to a static page description language to identify the plurality of candidate text strings; and
   generating a data structure comprising the plurality of candidate text strings.

18. The one or more non-transitory computer-readable media of claim 1, wherein the operations further comprise:
   receiving a query,
   identifying in the data corpus, based at least in part on the query, the first header and the first set of related text strings;
   responsive at least in part to identifying the first header and the first set of related text strings in the data corpus, rendering the first header and the first set of related text strings for display on a user interface device.

19. A method, comprising:
   identifying, in a data corpus, a first candidate text string for header classification;
   determining a first font of the first candidate text string;
   classifying the first candidate text string as a first header based at least in part on a first evaluation of the first font of the first candidate text string relative to one or more additional text strings in the data corpus;
   applying, to the first header, a first header tag at least in part responsive to classifying the first candidate text string as the first header;
   rendering the first header for display as a heading for a first set of related text strings in the data corpus;
   wherein the method is performed by at least one device including a hardware processor.

20. A system, comprising:
   at least one hardware processor;
   wherein the system is configured to execute operations, using the at least one hardware processor, the operations comprising:
      identifying, in a data corpus, a first candidate text string for header classification;
      determining a first font of the first candidate text string;
      classifying the first candidate text string as a first header based at least in part on a first evaluation of the first font of the first candidate text string relative to one or more additional text strings in the data corpus;
      applying, to the first header, a first header tag at least in part responsive to classifying the first candidate text string as the first header;
      rendering the first header for display as a heading for a first set of related text strings in the data corpus.

21. The one or more non-transitory computer-readable media of claim 1, wherein classifying the first candidate text string as the first header comprises:
   determining that the first candidate text string comprises one or more attributes that are not included in the one or more additional text strings, the one or more attributes of the first candidate text string comprising one or more of:
      bold characters, italic characters, underline characters, enlarged characters relative to a size threshold, a distinctive font type according to a distinctive font schedule, uppercase characters, capitalized characters, color characters, or a distinctive color according to a distinctive color schedule.

22. The one or more non-transitory computer-readable media of claim 1, wherein the operations further comprise:
   assigning to the first header, a first header format from a header formatting schedule based at least in part on the first header having a first position in a font prominence hierarchy.

23. The one or more non-transitory computer-readable media of claim 22, wherein the first header format corresponds to a particular header level in the header formatting schedule.

24. The one or more non-transitory computer-readable media of claim 22, wherein the operations further comprise:
   assigning to a second header, a second header format from the header formatting schedule based at least in part on the second header having a second position in the font prominence hierarchy.

25. The one or more non-transitory computer-readable media of claim 24, wherein the second header format corresponds to an incremental step from the first header format in the header formatting schedule.

26. The one or more non-transitory computer-readable media of claim 1, wherein the operations further comprise:
   identifying, for the first candidate text string, a first font characteristic that meets a set of one or more prevalence criteria;
   determining that the first font characteristic meets a set of one or more font characteristic criteria;

classifying the first candidate text string as the first header at least in part responsive to determining that the first font characteristic, that meets the set of one or more prevalence criteria, meets the set of one or more font characteristic criteria;

wherein the set of one or more prevalence criteria comprises a threshold number of elements that exhibit the first font characteristic.

27. The one or more non-transitory computer-readable media of claim 26, wherein the operations further comprise:

identifying, in the data corpus, a second candidate text string for header classification;

identifying, for the second candidate text string, a second font characteristic that meets the set of one or more prevalence criteria;

determining that the set of one or more font characteristic criteria are unmet by the second font characteristic;

disqualifying the second candidate text string for header classification responsive to determining that the set of one or more font characteristic criteria are unmet by the second font characteristic.

28. The one or more non-transitory computer-readable media of claim 1, wherein the operations further comprise:

computing, for the first candidate text string, a group characteristic comprising a number of elements in the first candidate text string;

determining that the group characteristic meets a set of one or more group characteristic criteria;

classifying the first candidate text string as the first header at least in part responsive to determining that the group characteristic meets the set of one or more group characteristic criteria;

wherein the set of one or more group characteristic criteria comprises a first number of elements in the first candidate text string meeting a threshold number of elements.

29. The one or more non-transitory computer-readable media of claim 1, wherein the operations further comprise:

partitioning the data corpus into a plurality of candidate text strings based at least in part on a context-free lexical rule.

30. The one or more non-transitory computer-readable media of claim 1, wherein the operations further comprise:

partitioning the data corpus into a plurality of candidate text strings based at least in part on a context-sensitive lexical rule.

* * * * *